(12) United States Patent
Hendry et al.

(10) Patent No.: US 12,477,149 B2
(45) Date of Patent: *Nov. 18, 2025

(54) INDEX SIGNALING FOR REFERENCE PICTURE LIST STRUCTURES

(71) Applicant: Huawei Technologies Co., Ltd., Shenzhen (CN)

(72) Inventors: Fnu Hendry, San Diego, CA (US); Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/196,205

(22) Filed: Mar. 9, 2021

(65) Prior Publication Data

US 2021/0195178 A1 Jun. 24, 2021

Related U.S. Application Data

(63) Continuation of application No. PCT/US2019/050857, filed on Sep. 12, 2019.
(Continued)

(51) Int. Cl.
*H04N 19/58* (2014.01)
*H04N 19/105* (2014.01)
(Continued)

(52) U.S. Cl.
CPC ........... *H04N 19/58* (2014.11); *H04N 19/105* (2014.11); *H04N 19/159* (2014.11);
(Continued)

(58) Field of Classification Search
None
See application file for complete search history.

(56) References Cited

U.S. PATENT DOCUMENTS 9,602,813 B2 * 3/2017 Song ................... H04N 19/105
9,854,248 B2 12/2017 Kim et al.
(Continued)

FOREIGN PATENT DOCUMENTS

CN 101653001 A 2/2010
CN 103339936 A 10/2013
(Continued)

OTHER PUBLICATIONS

Sjoberg et al., "Overview of HEVC High-Level Syntax and Reference Picture Management," IEEE Transactions on Circuits and Systems for Video Technology, Vo. 22, No. 12, Dec. 2012.*
(Continued)

*Primary Examiner* — Michael J Hess
(74) *Attorney, Agent, or Firm* — Conley Rose, P.C.

(57) ABSTRACT

A method of decoding a coded video bitstream is provided. The method includes parsing a flag; parsing a first reference picture list structure; determining that an index to a second reference picture list structure is not present in a slice header of the coded video bitstream and inferring that the index to the second reference picture list structure is the same as an index to the first reference picture list structure when the flag has a first value; determining that the index to the second reference picture list structure is present in the slice header when the flag has a second value; generating a reference picture list using the first reference picture list structure or the second reference picture list structure; and performing inter-prediction based on the reference picture list to generate a reconstructed block.

30 Claims, 8 Drawing Sheets

Related U.S. Application Data

(60) Provisional application No. 62/848,147, filed on May 15, 2019, provisional application No. 62/730,172, filed on Sep. 12, 2018.

(51) Int. Cl.
  *H04N 19/159* (2014.01)
  *H04N 19/176* (2014.01)
  *H04N 19/46* (2014.01)
  *H04N 19/70* (2014.01)

(52) U.S. Cl.
  CPC ........... *H04N 19/176* (2014.11); *H04N 19/46* (2014.11); *H04N 19/70* (2014.11)

(56) References Cited

U.S. PATENT DOCUMENTS

| | | | |
|---|---|---|---|
| 11,425,369 | B2 | 8/2022 | Sjoberg et al. |
| 2012/0027089 | A1 | 2/2012 | Chien et al. |
| 2012/0163466 | A1 | 6/2012 | Sugio et al. |
| 2012/0189058 | A1 | 7/2012 | Chen et al. |
| 2013/0077677 | A1 | 3/2013 | Wang et al. |
| 2013/0114670 | A1 | 5/2013 | Chen et al. |
| 2013/0114705 | A1 | 5/2013 | Chen et al. |
| 2013/0114742 | A1* | 5/2013 | Hannuksela ......... H04N 19/463 375/240.25 |
| 2013/0215975 | A1 | 8/2013 | Samuelsson et al. |
| 2013/0235933 | A1* | 9/2013 | Sasai ................... H04N 19/573 375/240.12 |
| 2013/0259130 | A1 | 10/2013 | Coban et al. |
| 2014/0016701 | A1 | 1/2014 | Chen et al. |
| 2014/0092965 | A1 | 4/2014 | Joshi et al. |
| 2014/0092991 | A1 | 4/2014 | Sullivan et al. |
| 2014/0211849 | A1 | 7/2014 | Deshpande |
| 2014/0321547 | A1* | 10/2014 | Takehara ............. H04N 19/105 375/240.16 |
| 2015/0071351 | A1* | 3/2015 | Lee ....................... H04N 19/70 375/240.12 |
| 2015/0103882 | A1 | 4/2015 | Kim et al. |
| 2015/0195577 | A1 | 7/2015 | Hannuksela |
| 2016/0057439 | A1 | 2/2016 | Yamamoto et al. |
| 2017/0272746 | A1 | 9/2017 | Sugio et al. |
| 2017/0318309 | A1* | 11/2017 | Sullivan ................ H04N 19/58 |
| 2018/0199051 | A1 | 7/2018 | Hannuksela et al. |
| 2018/0205965 | A1 | 7/2018 | Chen et al. |
| 2018/0352247 | A1* | 12/2018 | Park ..................... H04N 19/573 |
| 2019/0166380 | A1* | 5/2019 | Chen ................... H04N 19/176 |
| 2019/0262804 | A1 | 8/2019 | Li et al. |
| 2019/0313113 | A1* | 10/2019 | Lee ..................... H04N 19/577 |

FOREIGN PATENT DOCUMENTS

| | | |
|---|---|---|
| CN | 103797797 A | 5/2014 |
| CN | 103814574 A | 5/2014 |
| CN | 104272742 A | 1/2015 |
| CN | 106559669 A | 4/2017 |
| CN | 106664424 A | 5/2017 |
| JP | 2014522176 A | 8/2014 |
| JP | 2014526858 A | 10/2014 |
| JP | 2015527817 A | 9/2015 |
| JP | 2015534776 A | 12/2015 |
| JP | 2015534779 A | 12/2015 |
| WO | 2012033327 A2 | 3/2012 |
| WO | 2012067966 A1 | 5/2012 |
| WO | 2012090491 A1 | 7/2012 |
| WO | 2020011796 A1 | 1/2020 |

OTHER PUBLICATIONS

Wang et al., "On reference picture management for VVC," JVET-L0122-v4, 12th Meeting: Macao, CN, Oct. 2018.*

Hanuksela et al., "AHG21: On reference picture list construction and reference picture marking," JCTVC-G643r1, 7th Meeting: Geneva, CH, Nov. 2011.*

Hannuksela, M., et al., "AHG21: On reference picture list construction and reference picture marking," oint Collaborative Team on Video Coding (JCT-VC) of ITU-T SG16 WP3 and ISO/IEC JTC1/SC29/WG11, 7th Meeting: Geneva, CH, Nov. 21-30, 2011, JCTVC-G643r1, 17 pages.

"Line Transmission of Non-Telephone Signals Video Codec for Audiovisual Services at p × 64 kbits," ITU-T Recommendation H.261, Mar. 1993, 29 pages.

"Transmission of Non-Telephone Signals; Information Technology—Generic Coding of Moving Pictures and Associated Audio Information: Video," ITU-T Recommendation H.262, Jul. 1995, 211 pages.

"Series H: Audiovisual and Multimedia Systems Infrastructure of audiovisual services—Coding of moving video; Video coding for low bit rate communication," ITU-T Recommendation H.263, Jan. 2005, 226 pages.

"Series H: Audiovisual and Multimedia Systems Infrastructure of audiovisual services—Coding of moving video; Advanced video coding for generic audiovisual services" ITU-T Recommendation H.264, Jun. 2019, 836 pages.

"Series H: Audiovisual and Multimedia Systems Infrastructure of audiovisual services Coding of moving video; High efficiency video coding," ITU-T Recommendation H.265, Apr. 2013, 317 pages.

Document: JVET-K1001-v1 "Versatile Video Coding (Draft 2)," Joint Video Experts Team (JVET) of ITU-T SG 16 WP 3 and ISO/IEC JTC1/SC29/WG11, 11th Meeting: Ljubljana, SI, Jul. 10-18, 2018, 43 pages.

Document: JVET-K0325-v2 "On High Level Syntax Starting Point," Joint Collaborative Team on Video Coding (JCT-VC) of ITU-T SG16 WP3 and ISO/IEC JTC1/SC29/WG11, 11th Meeting: Ljubljana, SI, Jul. 10-18, 2018, 6 pages.

Document: JCTVC-G643, "AHG21: On reference picture list construction and reference picture marking," Joint Collaborative Team on Video Coding (JCT-VC) of ITU-T SG16 WP3 and ISO/IEC JTC1/SC29/WG11, 7th Meeting: Geneva, CH, Nov. 21-30, 2011, 10 pages.

Document: JVET-L0112-v4, Wang, Y.K., et al, "On reference picture management for VVC," Joint Video Experts Team (JVET) of ITU-T SG 16 WP 3 and ISO/IEC JTC 1/SC 29/WG 11, 12th Meeting: Macao, CN, Oct. 3-12, 2018, 18 pages.

Document: JCTVC-G643, Hannuksela, M., et al., "AHG21: On reference picture list construction and reference picture marking," Joint Collaborative Team on Video Coding (JCT-VC) of ITU-T SG16 WP3 and ISO/IEC JTC1/SC29/WG11, 7th Meeting: Geneva, CH, Nov. 21-30, 2011, 12 pages.

Hannuksela M M et al "AHG21: Removal of reference picture listmodification" JCTVC-H0426, Jan. 20, 2012, XP030111453, 10 pages.

Shen Yan-Fei et al, High Efficiency Video Coding, vol. 36, No. 11, Nov. 2013,16 pages.

Document: JVET-M1001-v5, Benjamin Bross et al, Versatile Video Coding (Draft 4), Joint Video Experts Team (JVET) of ITU-T SG 16 WP 3 and ISO/IEC JTC 1/SC 29/WG 11, 13th Meeting: Marrakech, MA, Jan. 9-18, 2019, 8 pages.

Document: JVET-K1001-v6, Benjamin Bross et al., "Versatile Video Costing (Draft 2)," Joint Video Experts Team (JVET) of ITU-T SG 16 WP 3 and ISO/IEC JTC 1/SC 29/WG 11, 11th Meeting: Ljubljana, SI, Jul. 10-18, 2018, 142 pages.

Document: JVET-L0122-v2, Wang et al., "On reference picture management for WC," Joint Video Exploration Team (JVET) of ITU-T SG 16 WP 3 and ISO/IEC JTC 1/SC 29/WG 11, 12th Meeting: Macao, CN, Oct. 3-12, 2018, 7 pages.

\* cited by examiner

INDEX SIGNALING FOR REFERENCE PICTURE LIST STRUCTURES

CROSS-REFERENCE TO RELATED APPLICATIONS

This application is a continuation of International Application No. PCT/US2019/050857 filed on Sep. 12, 2019, by Futurewei Technologies, Inc., and titled "Index Signaling for Reference Picture List Structures," which claims the benefit of U.S. Provisional Patent Application No. 62/730,172, filed Sep. 12, 2018, by Fnu Hendry, et al., and titled "Bit Count Reduction for Reference Picture Management Based on Reference Picture Lists in Video Coding," and U.S. Provisional Patent Application No. 62/848,147, filed May 15, 2019, by Fnu Hendry, et al., and titled "Bit Count Reduction for Reference Picture Management Based on Reference Picture Lists in Video Coding," each of which is hereby incorporated by reference.

TECHNICAL FIELD

In general, this disclosure describes techniques for signaling efficiency improvements on reference picture management in video coding. More specifically, this disclosure describes techniques for improved signaling for construction of reference picture lists and reference picture marking that is directly based on reference picture lists.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect relates to a method of decoding a coded video bitstream implemented by a video decoder. The method comprises parsing, from the coded video bitstream, a flag; parsing, from the coded video bitstream, a first reference picture list structure; determining that an index to a second reference picture list structure is not present in a slice header of the coded video bitstream and inferring that the index to the second reference picture list structure is the same as an index to the first reference picture list structure when the flag has a first value; determining that the index to the second reference picture list structure is present in the slice header when the flag has a second value; generating a reference picture list using at least one of the first reference picture list structure or the second reference picture list structure; and performing inter-prediction based on the reference picture list to generate a reconstructed block.

The method provides techniques that simplify and make more efficient the coding process. By using a flag to specify whether an index to a second reference picture list structure may be inferred to be the same as an index for a first reference picture list structure, the coder/decoder (a.k.a., "codec") in video coding is improved (e.g., utilizes less bits, demands less bandwidth, is more efficient, etc.) relative to current codecs. As a practical matter, the improved video coding process offers the user a better user experience when videos are sent, received, and/or viewed.

In a first implementation form of the method according to the first aspect as such, the flag is designated rpl1_idx_present_flag.

In a second implementation form of the method according to the first aspect as such or any preceding implementation form of the first aspect, the flag is included in a picture parameter set (PPS) of the coded video bitstream.

In a third implementation form of the method according to the first aspect as such or any preceding implementation form of the first aspect, the flag is included in a sequence parameter set (SPS) of the coded video bitstream.

In a fourth implementation form of the method according to the first aspect as such or any preceding implementation form of the first aspect, the first reference picture list structure is included in the slice header of the coded video bitstream.

In a fifth implementation form of the method according to the first aspect as such or any preceding implementation form of the first aspect, the flag is included in a picture parameter set (PPS) of the coded video bitstream and the first reference picture list structure is included in the slice header of the coded video bitstream.

In a sixth implementation form of the method according to the first aspect as such or any preceding implementation form of the first aspect, the first value of the flag is one (1).

In a seventh implementation form of the method according to the first aspect as such or any preceding implementation form of the first aspect, a ref_pic_list_sps_flag[1] and a ref_pic_list_idx[1] are not included in the slice header when the first value of the flag is one (1).

In an eighth implementation form of the method according to the first aspect as such or any preceding implementation form of the first aspect, the second value of the flag is zero (0).

In a ninth implementation form of the method according to the first aspect as such or any preceding implementation form of the first aspect, a ref_pic_list_sps_flag[0] and a ref_pic_list_idx[0] are included in the slice header when the second value of the flag is zero (0).

A second aspect relates to a method of encoding a video bitstream implemented by a video encoder, comprising encoding a flag with a first value into the video bitstream when an index to a second reference picture list structure is not encoded in a slice header of the video bitstream and the index to the second reference picture list structure should be inferred by a video decoder to be the same as an index to a first reference picture list structure; encoding a flag with a second value into the video bitstream when the index to the second reference picture list structure is encoded into the slice header of the video bitstream; encoding the first reference picture list structure into the video bitstream when the flag is encoded with the first value; encoding the first reference picture list structure and the second reference picture list structure into the video bitstream when the flag is encoded with the second value; and transmitting the video bitstream toward the video decoder.

The method provides techniques that simplify and make more efficient the coding process. By using a flag to specify whether an index to a second reference picture list structure may be inferred to be the same as an index for a first reference picture list structure, the coder/decoder (a.k.a., "codec") in video coding is improved (e.g., utilizes less bits, demands less bandwidth, is more efficient, etc.) relative to current codecs. As a practical matter, the improved video coding process offers the user a better user experience when videos are sent, received, and/or viewed.

In a first implementation form of the method according to the second aspect as such, the flag is designated rpl1_idx_present_flag.

In a second implementation form of the method according to the second aspect as such or any preceding implementation form of the second aspect, the flag is encoded in a picture parameter set (PPS) of the coded video bitstream.

In a third implementation form of the method according to the second aspect as such or any preceding implementation form of the second aspect, the first reference picture list structure is encoded in the slice header of the coded video bitstream.

In a fourth implementation form of the method according to the second aspect as such or any preceding implementation form of the second aspect, the first reference picture list structure and the second reference picture list are encoded in the slice header of the coded video bitstream.

In a fifth implementation form of the method according to the second aspect as such or any preceding implementation form of the second aspect, the first value of the flag is one (1) and the second value of the flag is zero (0).

In a sixth implementation form of the method according to the second aspect as such or any preceding implementation form of the second aspect, a ref_pic_list_sps_flag[1] and a ref_pic_list_idx[1] are not included in the slice header when the first value of the flag is one (1).

A third aspect relates to a decoding device comprising a receiver configured to receive a coded video bitstream; a memory coupled to the receiver, the memory storing instructions; and a processor coupled to the memory, the processor configured to execute the instructions stored in the memory to cause the processor to: parse, from the coded video bitstream, a flag; parse, from the coded video bitstream, a first reference picture list structure; determine that an index to a second reference picture list structure is not present in a slice header of the coded video bitstream and infer that the index to the second reference picture list structure is the same as an index to the first reference picture list structure when the flag has a first value; determine that the index to the second reference picture list structure is present in the slice header when the flag has a second value; generate a reference picture list using at least one of the first reference picture list structure or the second reference picture list structure; and perform inter-prediction based on the reference picture list to generate a reconstructed block.

The decoding device provides techniques that simplify and make more efficient the coding process. By using a flag to specify whether an index to a second reference picture list structure may be inferred to be the same as an index for a first reference picture list structure, the coder/decoder (a.k.a., "codec") in video coding is improved (e.g., utilizes less bits, demands less bandwidth, is more efficient, etc.) relative to current codecs. As a practical matter, the improved video coding process offers the user a better user experience when videos are sent, received, and/or viewed.

In a first implementation form of the decoding device according to the third aspect as such, the decoding device includes a display configured to display an image generated using the reconstructed block.

In a second implementation form of the decoding device according to the third aspect as such or any preceding implementation form of the third aspect, the flag is designated rpl1_idx_present_flag.

In a third implementation form of the decoding device according to the third aspect as such or any preceding implementation form of the third aspect, the flag is included in a picture parameter set (PPS) of the coded video bitstream.

In a fourth implementation form of the decoding device according to the third aspect as such or any preceding implementation form of the third aspect, the first reference picture list structure is included in the slice header of the coded video bitstream.

In a fifth implementation form of the decoding device according to the third aspect as such or any preceding implementation form of the third aspect, the first value of the flag is one (1) and the second value of the flag is zero (0).

In a sixth implementation form of the decoding device according to the third aspect as such or any preceding implementation form of the third aspect, a ref_pic_list_sps_flag[1] and a ref_pic_list_idx[1] are not included in the slice header when the first value of the flag is one (1).

A fourth aspect relates to an encoding device comprising a processor configured to: encode a flag with a first value into the video bitstream when an index to a second reference picture list structure is not encoded in a slice header of the video bitstream and the index to the second reference picture list structure should be inferred by a video decoder to be the same as an index to a first reference picture list structure; encode a flag with a second value into the video bitstream when the index to the second reference picture list structure is encoded into the slice header of the video bitstream; encode the first reference picture list structure into the video bitstream when the flag is encoded with the first value; encode the first reference picture list structure and the second reference picture list structure into the video bitstream when the flag is encoded with the second value; and a transmitter coupled to the processor, the transmitter configured to transmit the video bitstream toward the video decoder.

The encoding device provides techniques that simplify and make more efficient the coding process. By using a flag to specify whether an index to a second reference picture list structure may be inferred to be the same as an index for a first reference picture list structure, the coder/decoder (a.k.a., "codec") in video coding is improved (e.g., utilizes less bits, demands less bandwidth, is more efficient, etc.) relative to current codecs. As a practical matter, the improved video coding process offers the user a better user experience when videos are sent, received, and/or viewed.

In a first implementation form of the encoding device according to the fourth aspect as such, the flag is designated rpl1_idx_present_flag.

In a second implementation form of the encoding device according to the fourth aspect as such or any preceding implementation form of the fourth aspect, the flag is encoded in a picture parameter set (PPS) of the coded video bitstream.

In a third implementation form of the encoding device according to the fourth aspect as such or any preceding implementation form of the fourth aspect, the first reference picture list structure is encoded in the slice header of the coded video bitstream.

In a fourth implementation form of the encoding device according to the fourth aspect as such or any preceding implementation form of the fourth aspect, the first value of the flag is one (1) and the second value of the flag is zero (0).

In a fifth implementation form of the encoding device according to the fourth aspect as such or any preceding implementation form of the fourth aspect, a ref_pic_list_sps_flag[1] and a ref_pic_list_idx[1] are not included in the slice header when the first value of the flag is one (1).

A fifth aspect relates to a coding apparatus comprising: a receiver configured to receive a bitstream to decode; a transmitter coupled to the receiver, the transmitter configured to transmit a decoded image to a display; a memory coupled to at least one of the receiver or the transmitter, the memory configured to store instructions; and a processor coupled to the memory, the processor configured to execute the instructions stored in the memory to perform the method in any of the embodiments disclosed herein.

The coding apparatus provides techniques that simplify and make more efficient the coding process. By using a flag to specify whether an index to a second reference picture list structure may be inferred to be the same as an index for a first reference picture list structure, the coder/decoder (a.k.a., "codec") in video coding is improved (e.g., utilizes less bits, demands less bandwidth, is more efficient, etc.) relative to current codecs. As a practical matter, the improved video coding process offers the user a better user experience when videos are sent, received, and/or viewed.

A seventh aspect relates to a system comprising an encoder including an encoding device in any of the embodiments disclosed herein; and a decoder in communication with the encoder, the decoder including a decoding device in any of the embodiments disclosed herein.

The system provides techniques that simplify and make more efficient the coding process. By using a flag to specify whether an index to a second reference picture list structure may be inferred to be the same as an index for a first reference picture list structure, the coder/decoder (a.k.a., "codec") in video coding is improved (e.g., utilizes less bits, demands less bandwidth, is more efficient, etc.) relative to current codecs. As a practical matter, the improved video coding process offers the user a better user experience when videos are sent, received, and/or viewed.

An eighth aspect relates to means for coding comprising receiving means configured to receive a bitstream to decode; transmission means coupled to the receiving means, the transmission means configured to transmit a decoded image to a display means; storage means coupled to at least one of the receiving means or the transmission means, the storage means configured to store instructions; and processing means coupled to the storage means, the processing means configured to execute the instructions stored in the storage means to perform the method in any of the embodiments disclosed herein.

The means for coding provides techniques that simplify and make more efficient the coding process. By using a flag to specify whether an index to a second reference picture list structure may be inferred to be the same as an index for a first reference picture list structure, the coder/decoder (a.k.a., "codec") in video coding is improved (e.g., utilizes less bits, demands less bandwidth, is more efficient, etc.) relative to current codecs. As a practical matter, the improved video coding process offers the user a better user experience when videos are sent, received, and/or viewed.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The following are various acronyms employed herein: Decoded Picture Buffer (DPB), Instantaneous Decoding Refresh (IDR), Intra Random Access Point (IRAP), Least Significant Bit (LSB), Most Significant Bit (MSB), Network Abstraction Layer (NAL), Picture Order Count (POC), Raw Byte Sequence Payload (RBSP), Sequence Parameter Set (SPS), and Working Draft (WD).

Figure 1:
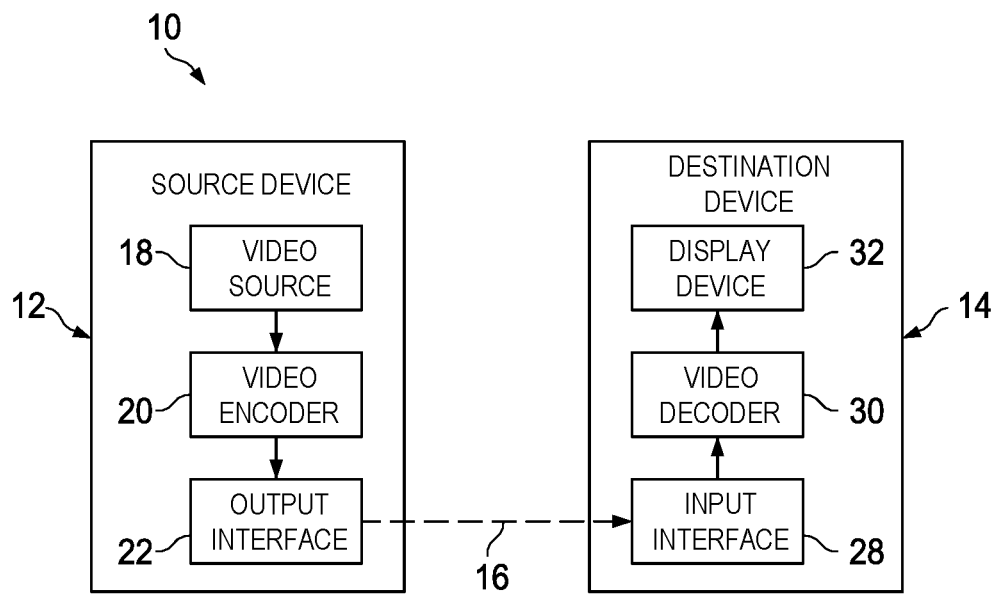
FIG. 1 is a block diagram illustrating an example coding system that may utilize bi-lateral prediction techniques.

FIG. 1 is a block diagram illustrating an example coding system 10 that may utilize video coding techniques as described herein. As shown in FIG. 1, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, digital video disks (DVD) s, Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 and/or the video decoder 30 of the destination device 14 may be configured to apply the techniques for video coding. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1 is merely one example. Techniques for video coding may be performed by any digital video encoding and/or decoding device. Although the techniques of this disclosure generally are performed by a video coding device, the techniques may also be performed by a video encoder/decoder, typically referred to as a "CODEC." Moreover, the techniques of this disclosure may also be performed by a video preprocessor. The video encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the International Telecommunications Union Telecommunication Standardization Sector (ITU-T) H.264 standard, alternatively referred to as Moving Picture Expert Group (MPEG)-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Figure 2:
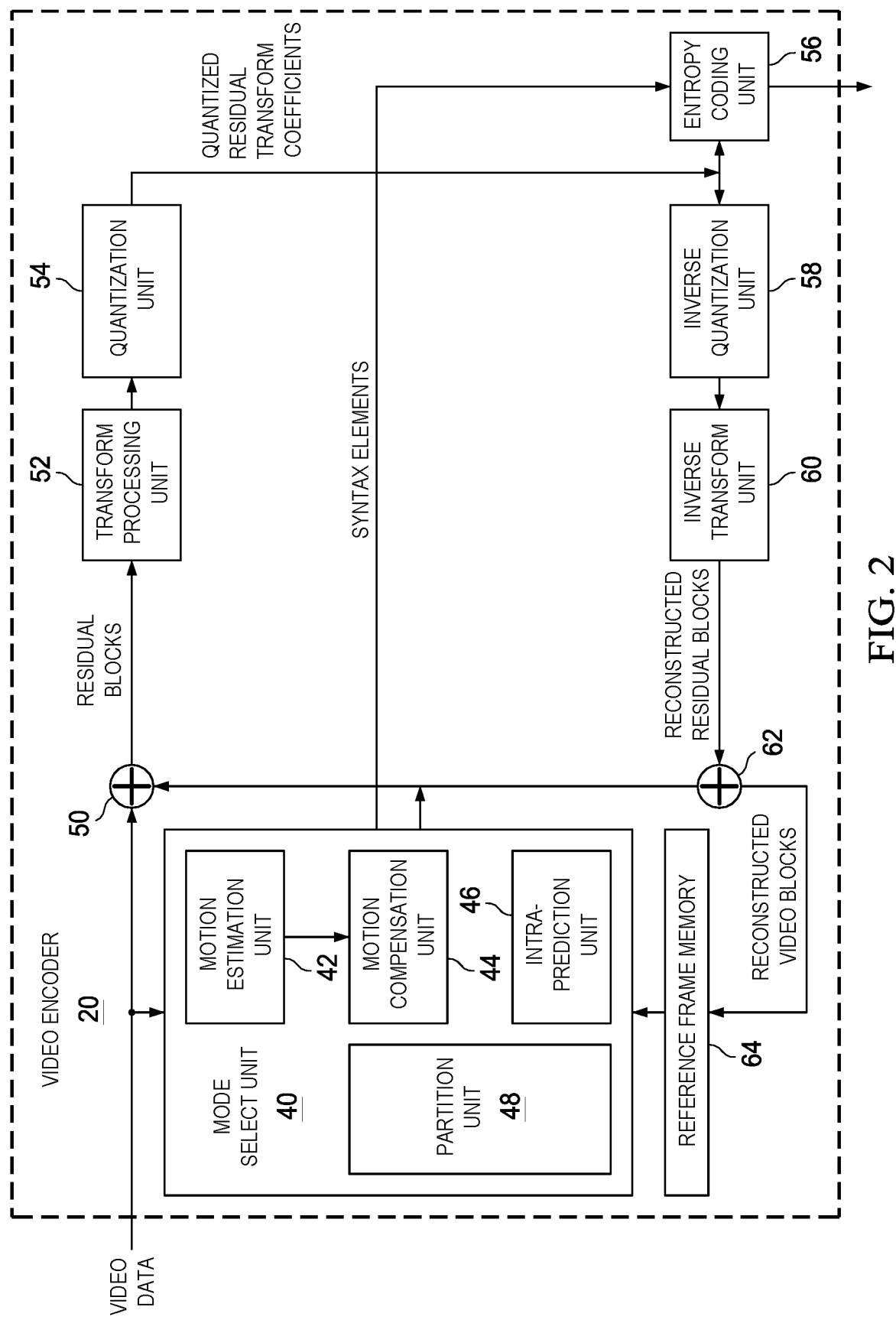
FIG. 2 is a block diagram illustrating an example video encoder that may implement bi-lateral prediction techniques.

FIG. 2 is a block diagram illustrating an example of video encoder 20 that may implement video coding techniques. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional (a.k.a., uni prediction) prediction (P mode) or bi-prediction (a.k.a., bi prediction) (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction (a.k.a., intra prediction) unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into largest coding units (LCUs), and partition each of the LCUs into sub-coding units (sub-CUs) based on rate-distortion analysis (e.g., rate-distortion optimization). Mode select unit 40 may further produce a quad-tree data structure indicative of partitioning of a LCU into sub-CUs. Leaf-node CUs of the quad-tree may include one or more prediction units (PUs) and one or more transform units (TUs).

The present disclosure uses the term "block" to refer to any of a CU, PU, or TU, in the context of HEVC, or similar data structures in the context of other standards (e.g., macroblocks and sub-blocks thereof in H.264/AVC). A CU includes a coding node, PUs, and TUs associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction (a.k.a., inter prediction) mode encoded. PUs may be partitioned to be non-square in shape. Syntax data associated with a CU may also describe, for example, partitioning of the CU into one or more TUs according to a quad-tree. A TU can be square or non-square (e.g., rectangular) in shape.

Mode select unit 40 may select one of the coding modes, intra- or inter-, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map using a depth modeling mode (DMM). Mode select unit 40 may determine whether an available DMM mode produces better coding results than an intra-prediction mode and the other DMM modes, e.g., using rate-distortion optimization (RDO). Data for a texture image corresponding to a depth map may be stored in reference frame memory 64. Motion estimation unit 42 and motion compensation unit 44 may also be configured to inter-predict depth blocks of a depth map.

After selecting an intra-prediction mode for a block (e.g., a conventional intra-prediction mode or one of the DMM modes), intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

Transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
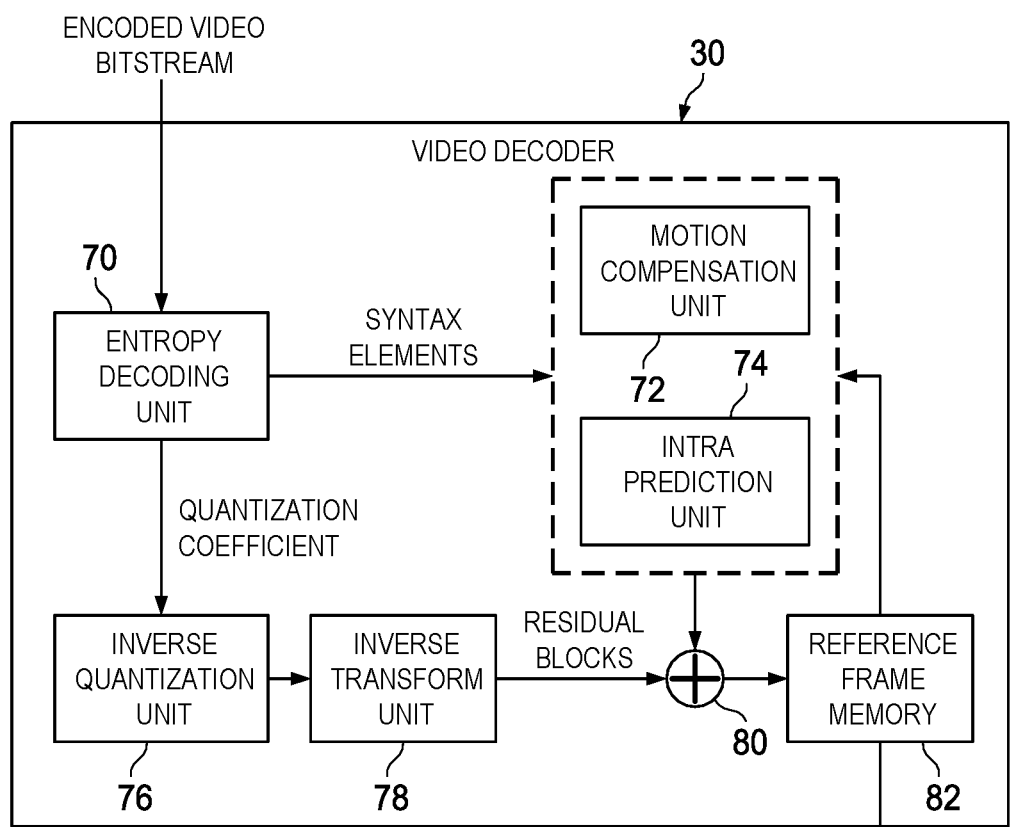
FIG. 3 is a block diagram illustrating an example of a video decoder that may implement bi-lateral prediction techniques.

FIG. 3 is a block diagram illustrating an example of video decoder 30 that may implement video coding techniques. In the example of FIG. 3, video decoder 30 includes an entropy decoding unit 70, motion compensation unit 72, intra-prediction unit 74, inverse quantization unit 76, inverse transformation unit 78, reference frame memory 82, and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of the video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra-prediction mode and data from previously decoded blocks of the current frame or picture. When the video frame is coded as an inter-coded (e.g., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Data for a texture image corresponding to a depth map may be stored in reference frame memory 82. Motion compensation unit 72 may also be configured to inter-predict depth blocks of a depth map.

Image and video compression has experienced rapid growth, leading to various coding standards. Such video coding standards include International Telecommunication Union (ITU) Telecommunications Standardization Sector (ITU-T) H.261, ISO/IEC Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and 3D AVC (3D-AVC). HEVC includes extensions such as Scalable HEVC (SHVC), Multiview HEVC (MV-HEVC), and 3D HEVC (3D-HEVC).

Versatile Video Coding (VVC) is a new video coding standard under development by the joint video experts team (JVET) of ITU-T and ISO/IEC. At the time of writing, the latest Working Draft (WD) of VVC included in JVET-K1001-v1. The JVET document JVET-K0325-v3 includes an update to the high-level syntax of VVC.

The present disclosure describes techniques intended to address the under-development of the VVC standard. However, the techniques may also be applied to other video/media codec specifications.

Video compression techniques perform spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

In a video codec specification, pictures are identified for multiple purposes, including for use as a reference picture in inter-prediction, for output of pictures from the decoded picture buffer (DPB), for scaling of motion vectors, for weighted prediction, etc. In AVC and HEVC, pictures can be identified by picture order count (POC). In AVC and HEVC, pictures in the DPB can be marked as "used for short-term reference," "used for long-term reference," or "unused for reference." Once a picture has been marked "unused for reference" it can no longer be used for prediction, and when it is no longer needed for output it can be removed from the DPB.

In AVC, there are two types of reference pictures, short-term and long-term. A reference picture may be marked as "unused for reference" when it becomes no longer needed for prediction reference. The conversion among these three statuses (short-term, long-term, and unused for reference) is controlled by the decoded reference picture marking process. There are two alternative decoded reference picture marking mechanisms, the implicit sliding window process and the explicit memory management control operation (MMCO) process. The sliding window process marks a short-term reference picture as "unused for reference" when the number of reference frames is equal to a given maximum number (max_num_ref_frames in the SPS). The short-term reference pictures are stored in a first-in, first-out manner so that the most recently decoded short-term pictures are kept in the DPB.

The explicit MMCO process may include multiple MMCO commands. An MMCO command may mark one or more short-term or long-term reference pictures as "unused for reference," mark all the pictures as "unused for reference," or mark the current reference picture or an existing short-term reference picture as long-term, and assign a long-term picture index to that long-term reference picture.

In AVC, the reference picture marking operations as well as the processes for output and removal of pictures from the DPB are performed after a picture has been decoded.

HEVC introduces a different approach for reference picture management, referred to as reference picture set (RPS). The most fundamental difference with the RPS concept compared to MMCO/sliding window of AVC is that for each particular slice a complete set of the reference pictures that are used by the current picture or any subsequent picture is provided. Thus, a complete set of all pictures that must be kept in the DPB for use by the current or future picture is signaled. This is different from the AVC scheme where only relative changes to the DPB are signaled. With the RPS concept, no information from earlier pictures in decoding order is needed to maintain the correct status of reference pictures in the DPB.

The order of picture decoding and DPB operations in HEVC is changed compared to AVC in order to exploit the advantages of RPS and improve error resilience. In AVC picture marking and buffer operations, both output and removal of decoded pictures from the DPB are generally applied after a current picture has been decoded. In HEVC, the RPS is first decoded from a slice header of the current picture, then picture marking and buffer operations are generally applied before decoding the current picture.

Each slice header in HEVC must include parameters for signaling of the RPS for the picture containing the slices. The only exception is that no RPS is signaled for IDR slices, instead the RPS is inferred to be empty. For I slices that do not belong to an IDR picture, an RPS may be provided, even if they belong to an I picture since there may be pictures following the I picture in decoding order which use inter-prediction from pictures that preceded the I picture in decoding order. The number of pictures in an RPS shall not exceed the DPB size limit as specified by the sps_max_dec_pic_buffering syntax element in the SPS.

Each picture is associated with a POC value that represents the output order. The slice headers contain a fixed-length codeword, pic_order_cnt_lsb, representing the least significant bits of the full POC value, also known as the POC LSB. The length of the codeword is signaled in the SPS and can be between 4 and 16 bits. The RPS concept uses POC to identify reference pictures. Besides its own POC value, each slice header directly contains or inherits from the SPS a coded representation of the POC values (or the LSBs) of each picture in the RPS.

The RPS for each picture includes five different lists of reference pictures, also referred to the five RPS subsets. RefPicSetStCurrBefore includes all short-term reference pictures that are prior to the current picture in both decoding order and output order, and that may be used in inter prediction of the current picture. RefPicSetStCurrAfter includes all short-term reference pictures that are prior to the current picture in decoding order, that succeed the current picture in output order, and that may be used in inter-prediction of the current picture. RefPicSetStFoll includes all short-term reference pictures that may be used in inter-prediction of one or more of the pictures following the current picture in decoding order, and that are not used in inter-prediction of the current picture. RefPicSetLtCurr includes all long-term reference pictures that may be used in inter-prediction of the current picture. RefPicSetLtFoll includes all long-term reference pictures that may be used in inter-prediction of one or more of the pictures following the current picture in decoding order, and that are not used in inter-prediction of the current picture.

The RPS is signaled using up to three loops iterating over different types of reference pictures; short-term reference pictures with lower POC value than the current picture, short-term reference pictures with higher POC value than the current picture, and long-term reference pictures. In addition, a flag (used_by_curr_pic_X_flag) is sent for each reference picture indicating whether the reference picture is used for reference by the current picture (included in one of the lists RefPicSetStCurrBefore, RefPicSetStCurrAfter or RefPicSetLtCurr) or not (included in one of the lists RefPicSetStFoll or RefPicSetLtFoll).

Figure 4:
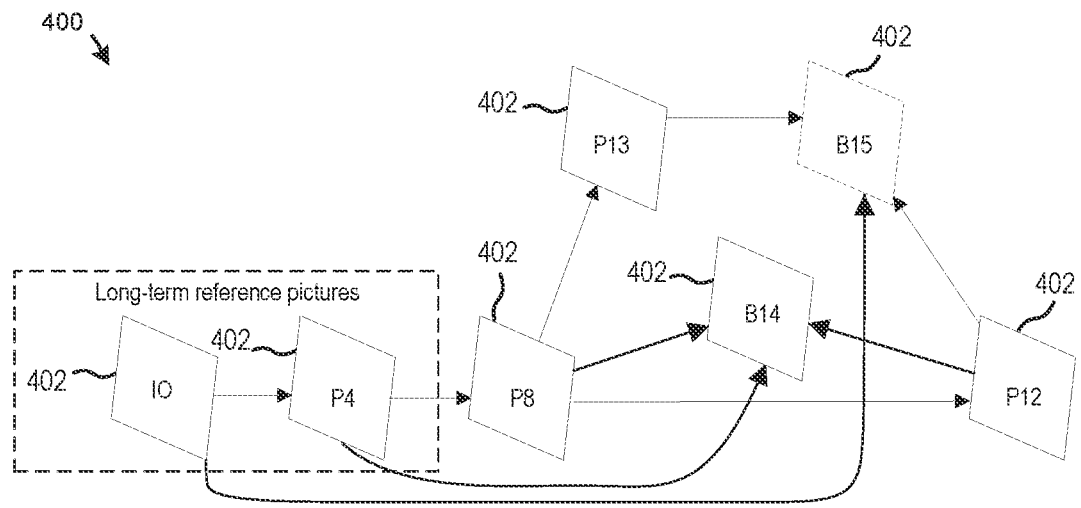
FIG. 4 is a schematic diagram illustrating a reference picture set (RPS) having a current picture with entries in all subsets of the RPS.

FIG. 4 illustrates an RPS 400 having a current picture B14 with entries (e.g., a picture) in all subsets 402 of the RPS 400. In the example in FIG. 4, the current picture B14 contains exactly one picture in each of the five subsets 402 (a.k.a., RPS subsets). P8 is the picture in the subset 402 referred to as RefPicSetStCurrBefore because the picture is before in output order and used by B14. P12 is the picture in the subset 402 referred to as RefPicSetStCurrAfter because the picture is after in output order and used by B14. P13 is the picture in the subset 402 referred to as RefPicSetStFoll because the picture is a short-term reference picture not used by B14 (but must be kept in the DPB since it is used by B15). P4 is the picture in the subset 402 referred to as RefPicSetLtCurr because the picture is a long-term reference picture used by B14. I0 is the picture in the subset 402 referred to as RefPicSetLtFoll since the picture is a long-term reference picture not used by the current picture (but must be kept in the DPB since it is used by B15).

The short-term part of the RPS 400 may be included directly in the slice header. Alternatively, the slice header may contain only a syntax element which represents an index, referencing to a predefined list of RPSs sent in the active SPS. The short-term part of the RPS 400 can be signaled using either of two different schemes; Inter RPS, as described below, or Intra RPS, as described here. When Intra RPS is used, num_negative_pics and num_positive_pics are signaled representing the length of two different lists of reference pictures. These lists contain the reference pictures with negative POC difference and positive POC difference compared to the current picture, respectively. Each element in these lists is encoded with a variable length code representing the difference in POC value relative to the previous element in the list minus one. For the first picture in each list, the signaling is relative to the POC value of the current picture minus one.

When encoding the recurring RPSs in the sequence parameter set, it is possible to encode the elements of one RPS (e.g., RPS 400) with reference to another RPS already encoded in the sequence parameter set. This is referred to as Inter RPS. There are no error robustness problems associated with this method as all the RPSs of the sequence parameter set are in the same network abstraction layer (NAL) unit. The Inter RPS syntax exploits the fact that the RPS of the current picture can be predicted from the RPS of a previously decoded picture. This is because all the reference pictures of the current picture must either be reference pictures of the previous picture or the previously decoded picture itself. It is only necessary to indicate which of these pictures should be reference pictures and be used for the prediction of the current picture. Therefore, the syntax comprises the following: an index pointing to the RPS to use as a predictor, a delta_POC to be added to the delta_POC of the predictor to obtain the delta POC of the current RPS, and a set of indicators to indicate which pictures are reference pictures and whether they are only used for the prediction of future pictures. In an embodiment, delta POC refers to the difference in POC value between a current reference picture and another (e.g., previous) reference picture.

Encoders that would like to exploit the use of long-term reference pictures must set the SPS syntax element long_term_ref_pics_present_flag to one. Long-term reference pictures can then be signaled in the slice header by fixed-length codewords, poc_lsb_lt, representing the least significant bits of the full POC value of each long-term picture. Each poc_lsb_lt is a copy of the pic_order_cnt_lsb codeword that was signaled for a particular long-term picture. It is also possible to signal a set of long-term pictures in the SPS as a list of POC LSB values. The POC LSB for a long-term picture can then be signaled in the slice header as an index to this list.

The delta_poc_msb_cycle_lt_minus1 syntax element can additionally be signaled to enable the calculation of the full POC distance of a long-term reference picture relative to the current picture. It is required that the codeword delta_poc_msb_cycle_lt_minus1 is signaled for each long-term reference picture that has the same POC LSB value as any other reference picture in the RPS.

For reference picture marking in HEVC, there will typically be a number of pictures present in the DPB before picture decoding. Some of them may be available for prediction and thus marked as "used for reference." Others may be unavailable for prediction but waiting for output, thus marked as "unused for reference." When the slice header has been parsed, a picture marking process is carried out before the slice data is decoded. Pictures that are present in the DPB and marked as "used for reference" but are not included in the RPS are marked "unused for reference." Pictures that are not present in the DPB but are included in the reference picture set are ignored if the used_by_curr_pic_X_flag is equal to zero. However, if the used_by_curr_pic_X_flag instead is equal to one, this reference picture was intended to be used for prediction in the current picture but is missing. Then, an unintentional picture loss is inferred and the decoder should take appropriate actions.

After decoding the current picture, it is marked "used for short-term reference."

Next, reference picture list construction in HEVC is discussed. In HEVC, the term inter-prediction is used to denote prediction derived from data elements (e.g., sample values or motion vectors) of reference pictures other than the current decoded picture. Like in AVC, a picture can be predicted from multiple reference pictures. The reference pictures that are used for inter-prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. Similar to AVC, the reference picture list construction in HEVC includes reference picture list initialization and reference picture list modification.

In AVC, the initialization process for List 0 is different for P slices (for which decoding order is used) and B slices (for which output order is used). In HEVC, output order is used in both cases.

Reference picture list initialization creates default List 0 and List 1 (if the slice is a B slice) based on three RPS subsets: RefPicSetStCurrBefore, RefPicSetStCurrAfter, and RefPicSetLtCurr. Short-term pictures with earlier (later) output order are firstly inserted into the List 0 (List 1) in ascending order of POC distance to the current picture, then short-term pictures with later (earlier) output order are inserted into the List 0 (List 1) in ascending order of POC distance to the current picture, and finally the long-term pictures are inserted at the end. In terms of RPS, for List 0, the entries in RefPicSetStCurrBefore are inserted in the initial list, followed by the entries in RefPicSetStCurrAfter. Afterwards, the entries in RefPicSetLtCurr, if available, are appended.

In HEVC, the above process is repeated (reference pictures that have already been added to the reference picture list are added again) when the number of entries in a list is smaller than the target number of active reference pictures (signaled in the picture parameter set or slice header). When the number of entries is larger than the target number, the list is truncated.

After a reference picture list has been initialized, it may be modified such that the reference pictures for the current picture may be arranged in any order, including the case where one particular reference picture may appear in more than one position in the list, based on the reference picture list modification commands. When the flag that indicates the presence of list modifications is set to one, a fixed number (equal to the target number of entries in the reference picture list) of commands are signaled, and each command inserts one entry for a reference picture list. A reference picture is identified in the command by the index to the list of reference pictures for the current picture derived from the RPS signaling. This is different from reference picture list modification in H.264/AVC, wherein a picture is identified either by the picture number (derived from the frame_num syntax element) or the long-term reference picture index, and it is possible that fewer commands are needed e.g., for swapping the first two entries of an initial list or inserting one entry at the beginning of the initial list and shifting the others.

A reference picture list is not allowed to include any reference picture with the TemporalId greater than the current picture. An HEVC bitstream might consist of several temporal sub-layers. Each NAL unit belongs to a specific sub-layer as indicated by the TemporalId (equal to temporal_id_plus1−1).

Reference picture management is directly based on reference picture lists. The JCT-VC document JCTVC-G643 includes an approach to directly use three reference picture lists, reference picture list 0, reference picture list 1, as well as an idle reference picture list, for management of the reference pictures in the DPB, thereby avoiding the need of the signaling and decoding processes for either 1) the sliding window and the MMCO processes as well as the reference picture list initialization and modification processes in AVC, or 2) the reference picture set as well as the reference picture list initialization and modification processes in HEVC.

Unfortunately, the Reference Picture Lists (RPL)-based reference picture management has drawbacks. For example, some RPL-based reference picture management schemes are not optimized in terms of the signaling of syntax elements in the bitstream. This causes such RPL-based approaches to have a higher bit count for signaling when compared to other explicit reference picture management approaches such as an RPS-based approach. The signaling inefficiency of the RPL-based approaches is due to several aspects.

For example, some syntax elements in an RPL structure are coded with less efficient entropy coding. For example, the coding of syntax element representing delta POC value of short-term reference pictures (STRPs) uses a signed integer 0-th order Exp-Golomb-coded syntax element with the left bit first (e.g., se (v)) because the delta POC value may have either a positive or a negative value. To encode any nonnegative integer x using the exp-Golomb code, the first step is to write down x+1 in binary. Next, count the bits written, subtract one, and then write that number of starting zero bits preceding the previous bit string. The first few values of the code are: 0⇒1⇒1, 1⇒10⇒010, 2⇒11⇒011, 3⇒100⇒00100. However, this can be made more efficient if the sign value and the absolute value of the delta POC are coded separately.

The signaling of RPL indices (e.g., for reference picture list 0 and reference picture list 1) when they refer to the predefined RPL structures in the parameter set (e.g., SPS) may not be highly efficient as such schemes always signal both indices. In many cases, the predefined RPL structures for RPL 0 and RPL 1 can be arranged such that when RPLs of a picture refer to the predefined RPL structures in the parameter set, the index for RPL 0 and the index for RPL 1 are the same.

Further, there is no inter-RPL coding for writing a reference picture list structure into a coded video bitstream. For example, RPL structures may be coded without reference to previously signaled RPL structure(s) in the bitstream. In an embodiment, an RPL structure refers to a programming construct that contains an indexed list of pointers to candidate reference pictures.

Described herein are several aspects, which can be applied individually and/or in combination, that solve the problems or address the drawbacks described herein. Each of those several aspects are detailed below.

In one aspect, the sign value and the absolute value are coded separately in the video bitstream when the delta POC values are coded for STRPs. To indicate whether delta POC values in each RPL structure have the same sign value (e.g., either all delta POCs in the same RPL structure are positive delta POC values or negative delta POC values), a flag is signaled in the same parameter set (e.g., SPS, PPS) as the predefined RPL structures. The flag may be referred to as an "all_rpl_entries_same_sign_flag."

When the all_rpl_entries_same_sign_flag is equal to 1, a flag is signaled in the RPL structure to indicate the sign value of all entries (e.g., sign value of delta POC values of STRPs) in the RPL structure. When the all_rpl_entries_same_sign_flag is equal to 0, a flag is signaled in the RPL structure to indicate the sign value for each of the entries associated with STRP in each RPL structure. In an embodiment, the absolute value of a delta POC value of STRP entries in the RPL structure is coded using unsigned integer 0-th order Exp-Golomb coding (e.g., ue(v)).

Alternatively, instead of one flag for of all_rpl_entries_same_sign_flag, two flags can be signaled; one for each RPL structure list (e.g., RPL structure list for RPL0 and RPL structure list for RPL1).

For encoding, when creating predefined RPL structures for RPL 0 and RPL 1 lists in the parameter set, the RPL structure in the list for RPL 0 and RPL 1 can be arranged such that the RPL structure for list 0 and the RPL structure for list 1 are paired. As such, when a picture refers to the predefined RPL structures in the parameter set, the indices for RPL0 and RPL0 of that picture are the same.

Related to the above point, a flag may indicate whether syntax elements for RPL 1 that reference to the predefined RPL structure are present or not in a slice header. The flag may be called the "rpl1_idx_present_flag." This flag can be signaled in SPS or PPS depending on the intended scope or persistence of the flag. In an embodiment, signaling of the flag in PPS is preferred.

Based on the value of the rpl1_idx_present_flag, the following applies. When the rpl1_idx_present_flag is equal to 1, whether the RPL 1 of the slice header associated with the parameter set containing the flag refers to the predefined RPL structure and its index is not signaled in the slice header and is instead inferred from the corresponding syntax element for the RPL 0 in the same slice. That is, ref_pic_list_sps_flag[1] and ref_pic_list_idx[1] are not signaled but inferred (e.g., copied) from the value of ref_pic_list_sps_flag[0] and ref_pic_list_idx[0], respectively. Otherwise, when the rpl1_idx_present_flag is equal to 0, ref_pic_list_sps_flag[1] and ref_pic_list_idx[1] are present in the slice header associated with the parameter set containing the flag.

Alternatively, based on the value of rpl1_idx_present_flag, the following applies. When the rpl1_idx_present_flag is equal to 1, the index of RPL 1 is not signaled in the slice header when RPL 1 of the slice header associated with the parameter set containing the flag refers to the predefined RPL structure. Rather, the index of RPL 1 is inferred from the corresponding syntax element for RPL 0 in the same slice. That is, ref_pic_list_idx[1] is not signaled but inferred (e.g., copied) from the value of ref_pic_list_idx[0], respectively. Otherwise, when the rpl1_idx_present_flag is equal to 0, ref_pic_list_idx[1] is present in the slice header associated with the parameter set containing the flag.

A flag may be utilized to indicate whether the RPL structures in the list for RPL 1 have identical content as RPL structures in the list for RPL 0. The flag may be referred to as "rpl1_copy_from_rpl0_flag." The flag is signaled in the same parameter set containing the predefined RPL structures and shall be located before the predefined RPL structures signaling.

Based on the value of rpl1_copy_from_rpl0_flag, the following applies. When the rpl1_copy_from_rpl0_flag is equal to 1, the number of RPL structures for list 1 is not signaled and is instead inferred to be the same as the number of RPL structures for list 0. No RPL structure for list 1 is signaled. Instead, after the predefined RPL structures for list 0 are parsed and decoded at the decoder, for each RPL structure for list 0, an exact same RPL structure copy is created and the RPL structure copy is assigned as RPL structure for list 1 with the same index. Otherwise, when the rpl1_copy_from_rpl0_flag is equal to 0, the number of RPL structures for list 1 and RPL structures for list 1 is signaled.

The content of an RPL structure may be predicted from another RPL structure. When predefined RPL structures in a parameter set are divided into two lists (e.g., RPL structures list for list 0 and RPL structures list for list 1), only RPL structures in the list for list 0 can be used as reference for inter-RPL. An RPL structure in the list for list 0 can only refer to another RPL structure in the same list with an index less than its index whereas an RPL structure in the list for list 1 can refer to any RPL structure in the list for list 0. The RPL structure signaled explicitly in the slice header can refer to any of the predefined RPL structures in the list for list 0. Alternatively, an RPL structure in the list for list 0 or list 1 can only to refer to another RPL structure in the list for list 0 with index less than its index. The RPL structure that is signaled explicitly in the slice header can refer to any of the predefined RPL structures in the list for list 0.

In one alternative, when predefined RPL structures in a parameter set are divided into two lists (e.g., RPL structures list for list 0 and RPL structures list for list 1), an RPL structure in the list for list 0 can only refer to another RPL structure in the list for list 0 with an index less than its index. Likewise, an RPL structure in the list for list 1 can only refer to another RPL structure in the list for list 1 with an index less than its index. The RPL structure signaled explicitly in the slice header for RPL0 can refer to any of the predefined RPL structures in the list for list 0 and RPL structure that is signaled explicitly in the slice header for RPL1 can refer to any of the predefined RPL structures in the list for list 1.

In another alternative, when predefined RPL structures in a parameter set are not divided into two lists (e.g., RPL structures list for list 0 and RPL structures list for list 1 are signaled in one list), an RPL structure can only refer to another RPL structure in the list with an index less than its index. The RPL structure signaled explicitly in the slice header can refer to any of the predefined RPL structures.

For inter-RPL, the index for reference RPL structure can be coded as the delta of the current RPL structure index and the reference RPL structure index minus 1 and coded with ue(v) coding. In one alternative, the reference RPL index is coded directly using u(v) coding. The number of bits used to represent the index is set as log 2 of the number of RPL structures in the list eligible for reference. For example, when only RPL structures in the list for list 0 can be used as the reference, the number of bits to represent the reference RPL index is log 2 of the number of RPL structures in the list for list 0. In another alternative, the index for the reference RPL structure may be coded using either ue(v) or u(v) depending on the mode of inter-RPL.

To support inter-RPL, each RPL structure is coded using one of the modes described below. Note that the order of the mode below does not necessarily mean the order for the value of the mode. The indication of the mode can be coded as follows. In an embodiment, the indication of the mode may be coded simply using ue(v). In an embodiment, the indication of the mode may be coded using u(v) with the number of bits to represent the mode being log 2 of the total number of the defined modes.

The first RPL coding mode is an intra-coding mode. This mode works the same as the other mechanisms to signal the content of RPL structure. See, for example, the method described in U.S. Provisional Application No. 62/719,360 filed Aug. 17, 2018 and entitled "Reference Picture Management in Video Coding." Alternatively, an integer value greater than 0 can be signaled for each RPL structure and called granularity_val. The value of granularity_val is used to scale or divide each value that represents the POC delta values of STRPs in the RPL structure.

The second RPL coding mode is an inter-coding mode that utilizes the delta POC values for STRPs in the reference RPL structure and the current RPL structure that have the same or uniform difference. To code RPL using this mode, the following information is signaled in the bitstream.

To begin, the coding mode and the reference index are signaled in the bitstream. The reference index is the index of the reference RPL structure. The reference index can be coded as described above. However, mechanisms may also code a reference index as the delta between the current RPL structure index and the reference RPL structure index minus 1 and coded as ue(v). The offset is also signaled in the bitstream. The offset is the difference between the delta POC of the STRP in the reference RPL structure and the delta POC of the STRP in the current RPL structure. The value of the offset can be constrained to be positive only (e.g., if the delta POC value of the STRP in the reference RPL structure is less than the delta POC value of the STRP in the current RPL structure, then this mode cannot be used to code current RPL structure), negative only, or can be either positive or negative. The offset can be signaled with term minus1 if it is coded as ue(v). A flag for each entry in the reference RPL structure to indicate whether the entry in used as an entry in the current RPL structure is also signaled in the bitstream. When an entry is an STRP entry in the reference RPL structure and is used as an entry in the current RPL structure, the entry is also an STRP entry in the current RPL structure and its value is the entry value in the reference RPL structure minus the offset (plus 1 if_minus1 term is used to code offset). When an entry is a long-term reference picture (LTRP) entry in the reference RPL structure and used as an entry in the current RPL structure, the entry is also an LTRP entry in the current RPL structure and its value is simply copied for the entry in the reference RPL structure.

The third RPL coding mode is an inter-coding mode that utilizes the fact that entries (e.g., STRP and LTRP) in the current RPL structure are a superset of entries in the reference RPL structure. That is, all the entries in the reference RPL structure are the same as the first X (replace X with number of entries in the reference RPL structure) with additional zero or more entries. To code RPL using this mode, the following information is signaled in the bitstream.

To begin, the coding mode and the reference index are signaled in the bitstream. The reference index is the index of the reference RPL structure. The reference index can be coded as described above. The number of additional entries is also signaled in the bitstream. The number of additional entries is the difference between the number of entries in the current RPL structure and the number of entries in the reference RPL structure. When an entry is an STRP entry in the reference RPL structure, the entry is also an STRP entry in the current RPL structure and its value is simply copied for the entry in the reference RPL structure. When an entry is an LTRP entry in the reference RPL structure, the entry is also an LTRP entry in the current RPL structure and its value is simply copied for the entry in the reference RPL structure. After all entries from the reference RPL structure are copied into the current RPL structure, for each additional entry, the following information is signaled: If long-term reference picture is used in the bitstream (i.e., this can be indicated by a flag in the same parameter set), a flag is signaled to indicate whether the additional entry is an LTRP entry or STRP entry. If the entry is an LTRP entry, the POC LSB of the LTRP entry is signaled. Otherwise, the delta POC of the STRP entry is signaled. The value of delta POC can be signaled as the delta from the previous STRP entry or simply the delta from the current picture's POC.

The fourth RPL coding mode is an inter coding mode that utilizes the fact that entries (e.g., STRP and LTRP) in the current RPL structure are either exactly the same as entries in the reference RPL structure or exactly the same with the sign value flipped. To code the RPLs using this mode, the following information is signaled in the bitstream.

To begin, the coding mode and the reference index are signaled. The reference index is the index of the reference RPL structure. The reference index can be coded as described above. Optionally, a flag to indicate whether sign value is flipped is also signaled in the bitstream.

When a bitstream is coded with forward inter-prediction (e.g., inter-prediction with reference to picture with POC value less than the current picture's POC value) and backward inter-prediction (e.g., inter-prediction with reference to picture with POC value greater than the current picture's POC value), the following constraints for reference pictures in an RPL apply. For each RPL of a picture, all reference pictures in the RPL are of the same inter-prediction direction, e.g., all reference pictures are reference pictures for forward inter-prediction or all reference pictures are reference pictures for backward inter-prediction. For the pair of RPLs of a picture, there shall be no reference picture contained in both RPL0 and RPL1 unless the following condition is true. The condition is that both RPL0 and RPL1 contain the same reference pictures with the same order. In such a condition, all reference pictures, except the first one (i.e., the one at the lowest index) in the RPL1, are removed from RPL1. Alternatively, all reference pictures, except the first one (i.e., the one at the lowest index) in the RPL0, are removed from RPL0.

Disclosed herein are video coding techniques that use a flag to specify whether an index to a second reference picture list structure may be inferred to be the same as an index for a first reference picture list structure. That is, an index to the second reference picture list structure is not present in a slice header of the coded video bitstream and is inferred to be the same as an index to the first reference picture list structure when the flag has a first value. On the other hand, the index to the second reference picture list structure is present in the slice header when the flag has a second value. By utilizing the flag in this manner, the coder/decoder (a.k.a., "codec") in video coding is improved (e.g., utilizes less bits, demands less bandwidth, is more efficient, etc.) relative to current codecs. As a practical matter, the improved video coding process offers the user a better user experience when videos are sent, received, and/or viewed.

Figure 5:
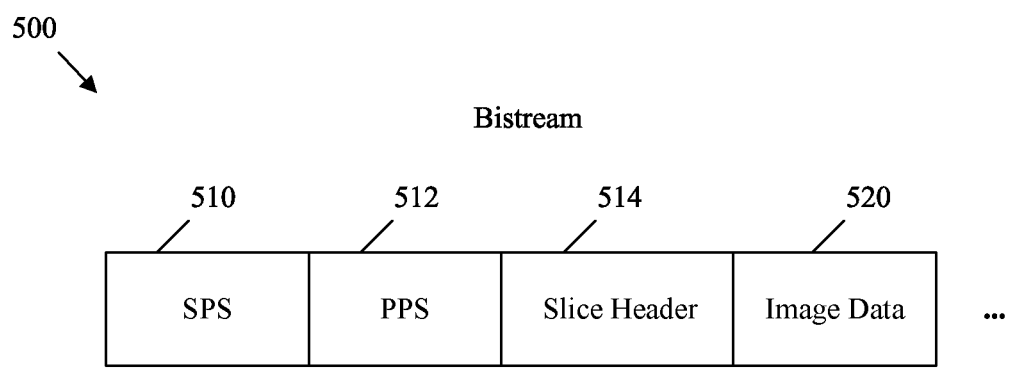
FIG. 5 is a schematic diagram of an embodiment of a video bitstream.

FIG. 5 is a schematic diagram of an embodiment of a video bitstream 500. As used herein the video bitstream 500 may also be referred to as a coded video bitstream, a bitstream, or variations thereof. As shown in FIG. 5, the bitstream 500 comprises a sequence parameter set (SPS) 510, a picture parameter set (PPS) 512, a slice header 514, and image data 520.

The SPS 510 contains data that is common to all the pictures in a sequence of pictures (SOP). In contrast, the PPS 512 contains data that is common to the entire picture. The slice header 514 contains information about the current slice such as, for example, the slice type, which of the reference pictures will be used, and so on. The SPS 510 and the PPS 512 may be generically referred to as a parameter set. The SPS 510, the PPS 512, and the slice header 514 are types of Network Abstraction Layer (NAL) units. The image data 520 comprises data associated with the images or video being encoded or decoded. The image data 520 may be simply referred to as the payload or data being carried in the bitstream 500.

In an embodiment, the SPS 510, the PPS 512, the slice header 514, or another portion of the bitstream 500 carries a plurality of reference picture list structures, each of which contains a plurality of reference picture entries. Those skilled in the art will appreciate that the bitstream 500 may contain other parameters and information in practical applications.

Figure 6:
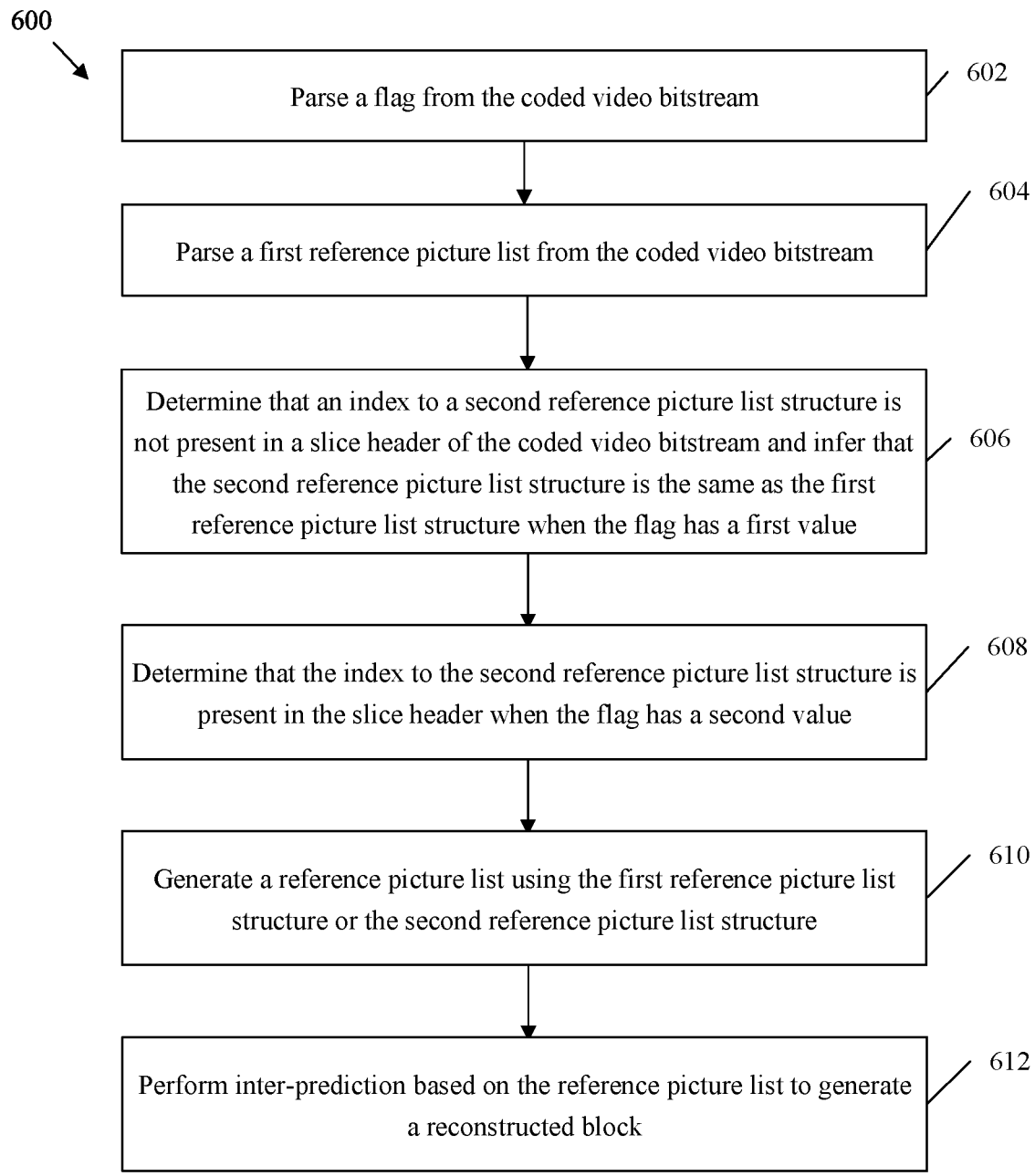
FIG. 6 is an embodiment of a method of decoding a coded video bitstream.

FIG. 6 is an embodiment of a method 600 of decoding a coded video bitstream (e.g., bitstream 500) implemented by a video decoder (e.g., video decoder 30). The method 600 may be performed after the decoded bitstream has been directly or indirectly received from a video encoder (e.g., video encoder 20). The method 600 improves the decoding process (e.g., makes the decoding process more efficient, faster, etc., than conventional decoding processes) because an index to a second reference picture list structure can be inferred to be the same as an index to the first reference picture list structure when a flag is set to a certain value. That is, the second reference picture list structure need not be signaled in the coded bitstream in every circumstance as in HEVC and AVC. Therefore, as a practical matter, the performance of a codec is improved, which leads to a better user experience.

In block 602, a flag is parsed from the coded video bitstream (e.g., the video bitstream 500). In an embodiment, the flag is designated rpl1_idx_present_flag. In an embodiment, the flag is included in the PPS (e.g., PPS 512) of the coded video bitstream. In an embodiment, the flag is included in the SPS (e.g., SPS 510) of the coded video bitstream.

In an embodiment, the first value of the flag is one (1). In an embodiment, a ref_pic_list_sps_flag[1] and a ref_pic_list_idx[1] are not included in the slice header when the first value of the flag is one (1). In an embodiment, the second value of the flag is zero (0). In an embodiment, a ref_pic_list_sps_flag[0] and a ref_pic_list_idx[0] are included in the slice header when the second value of the flag is zero (0).

In block 604, a first reference picture list structure is parsed from the coded video bitstream. In an embodiment, the first reference picture list structure is included in the slice header (e.g., the slice header 514) of the coded video bitstream. In an embodiment, the flag and the first reference picture list structure are parsed separately from each other. That is, the flag is parsed first, and then the first reference picture list structure is parsed, or vice versa.

In block 606, an index to a second reference picture list structure is determined to not be present in a slice header of the coded video bitstream and the index to the second reference picture list structure is inferred to be the same as an index to the first reference picture list structure when the flag has a first value. In block 608, the index to the second reference picture list structure is determined to be present in the slice header when the flag has a second value.

In block 610, a reference picture list is generated using the first reference picture list structure, the second reference picture list structure, or some combination thereof. The reference picture list may identify one or more pictures such as, for example, the pictures illustrated and described in connection with FIG. 4.

In block 612, inter-prediction is performed based on the reference picture list to generate a reconstructed block. In an embodiment, the reconstructed block may be used to generate or produce an image for display to a user on the display or screen of an electronic device (e.g., a smart phone, tablet, laptop, personal computer, etc.).

Figure 7:
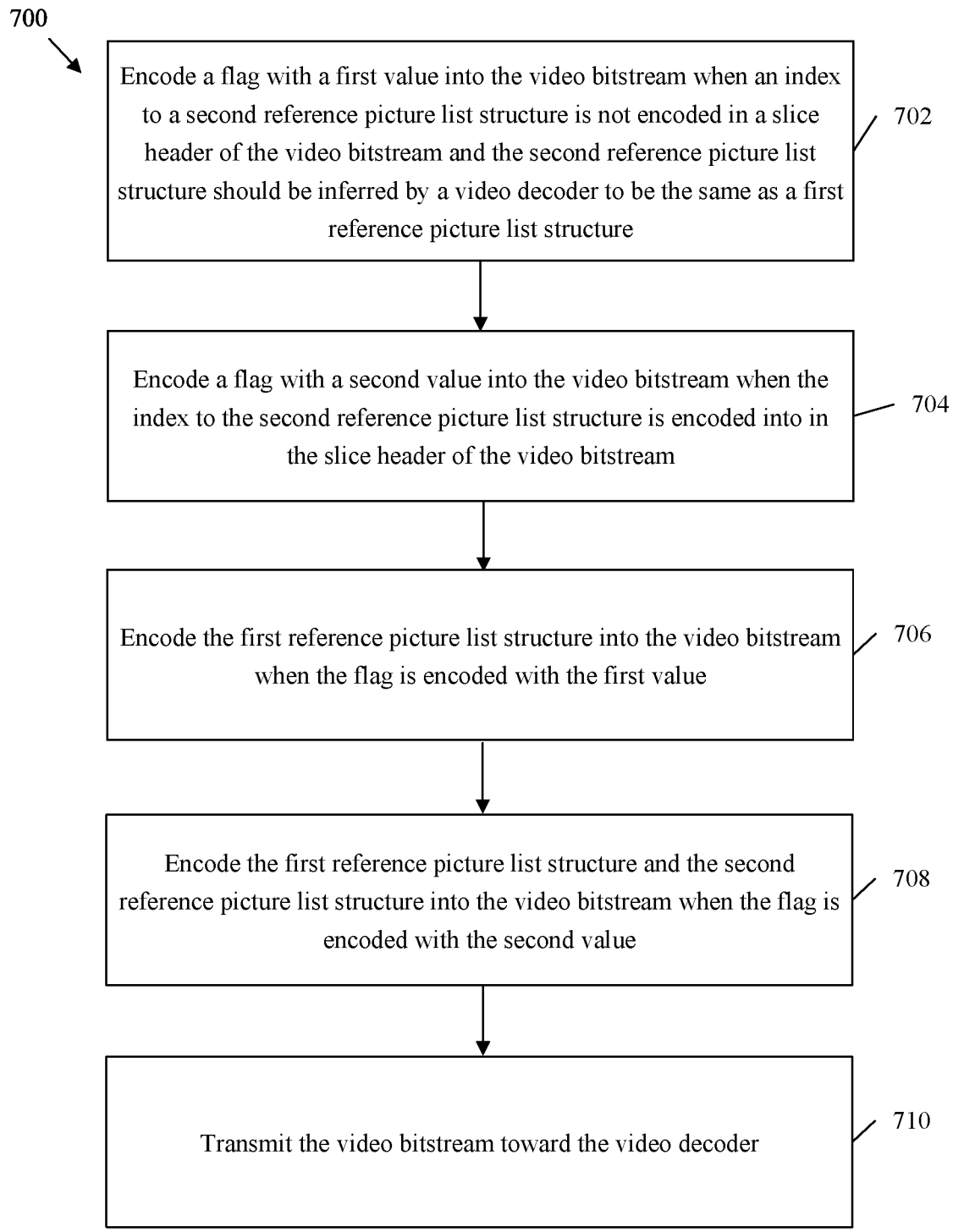
FIG. 7 is an embodiment of a method of encoding a video bitstream.

FIG. 7 is an embodiment of a method 700 of encoding a video bitstream (e.g., bitstream 500) implemented by a video encoder (e.g., video encoder 20). The method 700 may be performed when a picture (e.g., from a video) is to be encoded into a video bitstream and then transmitted toward a video decoder (e.g., video decoder 30). The method 700 improves the encoding process (e.g., makes the encoding process more efficient, faster, etc., than conventional encoding processes) because an index to a second reference picture list structure can be inferred to be the same as an index to the first reference picture list structure when a flag is set to a certain value. That is, the second reference picture list structure need not be signaled in the coded bitstream in every circumstance as in HEVC and AVC. Therefore, as a practical matter, the performance of a codec is improved, which leads to a better user experience.

In block 702, a flag with a first value is encoded into the video bitstream when an index to a second reference picture list structure is not encoded in a slice header of the video bitstream and the index to the second reference picture list structure should be inferred by a video decoder to be the same as an index to a first reference picture list structure. In an embodiment, the flag is designated as rpl1_idx_present_flag. In an embodiment, the flag is encoded in the PPS (e.g., PPS 512) of the coded video bitstream (e.g., video bitstream 500). In an embodiment, the first reference picture list structure is encoded in the slice header (e.g., slice header 514) of the video bitstream.

In block 704, a flag with a second value is encoded into the video bitstream when the index to the second reference picture list structure is encoded into in the slice header of the video bitstream. In an embodiment, the first reference picture list structure and the second reference picture list are encoded in the slice header of the coded video bitstream.

In block 706, the first reference picture list structure is encoded into the video bitstream when the flag is encoded with the first value. In block 708, the first reference picture list structure and the second reference picture list structure are encoded into the video bitstream when the flag is encoded with the second value. In an embodiment, the first value of the flag is one (1) and the second value of the flag is zero (0). In an embodiment, a ref_pic_list_sps_flag[1] and a ref_pic_list_idx[1] are not included in the slice header when the first value of the flag is one (1).

In block 710, the video bitstream is transmitted toward the video decoder (e.g., the video decoder 30). Once received by the video decoder, the encoded video bitstream may be decoded (e.g., as described above) to generate or produce an image for display to a user on the display or screen of an electronic device (e.g., a smart phone, tablet, laptop, personal computer, etc.).

A description of the techniques disclosed herein is provided relative to the latest VVC WD. In addition, definitions, syntax, and semantics suitable for implementing the techniques disclosed herein are also provided.

To begin, several definitions are provided. An intra random access point (IRAP) picture is a coded picture for which each video coding layer (VCL) NAL unit has nal_unit_type equal to IRAP_NUT. A long-term reference picture (LTRP) is a picture marked as "used for long-term reference." A non-IRAP picture is a coded picture for which each VCL NAL unit has nal_unit_type equal to NON_IRAP_NUT. A reference picture list is a list of reference pictures used for inter-prediction of a P or a B slice. Two reference picture lists, reference picture list 0 and reference picture list 1, are generated for each slice of a non-IRAP picture. The set of unique pictures referred to by all entries in the two reference picture lists associated with a picture includes all reference pictures that may be used for inter-prediction of the associated picture or any picture following the associated picture in decoding order. For decoding the slice data of a P slice, only reference picture list 0 is used for inter-prediction. For decoding the slice data of a B slice, both reference picture lists are used for inter-prediction. For decoding the slice data of an I slice, no reference picture list is used for inter-prediction. A short-term reference picture (STRP) is a picture marked as "used for short-term reference."

Next, some abbreviations are provided. As used herein, LTRP stands for Long-Term Reference Picture and STRP stands for Short-Term Reference Picture.

The following portions of the disclosure provide the syntax and semantics suitable for implementing the techniques disclosed herein.

NAL Unit Header Syntax

| nal_unit_header( ) { | Descriptor |
|---|---|
|   forbidden_zero_bit | f(1) |
|   nal_unit_type | u(5) |
|   nuh_temporal_id_plus1 | u(3) |
|   nuh_reserved_zero_7bits | u(7) |
| } | |

Sequence Parameter Set RBSP Syntax

| seq_parameter_set_rbsp( ) { | Descriptor |
|---|---|
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_in_luma_samples | ue(v) |
|   pic_height_in_luma_samples | ue(v) |
|   bit_depth_luma_minus8 | ue(v) |
|   bit_depth_chroma_minus8 | ue(v) |
|   log2_max_pic_order_cnt_lsb_minus4 | ue(v) |
|   sps_max_dec_pic_buffering_minus1 | ue(v) |
|   qtbtt_dual_tree_intra_flag | ue(v) |
|   log2_ctu_size_minus2 | ue(v) |
|   log2_min_qt_size_intra_slices_minus2 | ue(v) |
|   log2_min_qt_size_inter_slices_minus2 | ue(v) |
|   max_mtt_hierarchy_depth_inter_slices | ue(v) |

-continued

| | |
|---|---|
| max_mtt_hierarchy_depth_intra_slices | ue(v) |
| long_term_ref_pics_flag | u(1) |
| if( long_term_ref_pics_flag ) | |
|    additional_lt_poc_lsb | ue(v) |
| all_rpl_entries_same_sign_flag | u(1) |
| rpl1_copy_from_rpl0_flag | u(1) |
| for(i= 0; i < ( !rpl1_copy_from_rpl0_flag ) ? 2 : 1; i++) { | |
|   num_ref_pic_lists_in_sps[ i ] | ue(v) |
|   for( j = 0; j < num_ref_pic_lists_in_sps[ i ]; j++) | |
|     ref_pic_list_struct( i, j, long_term_ref_pics_flag ) | |
| } | |
| rbsp_trailing_bits( ) | |
| } | |

Picture Parameter Set RBSP Syntax

| | Descriptor |
|---|---|
| pic_parameter_set_rbsp( ) { | |
|   pps_pic_parameter_set_id | ue(v) |
|   pps_seq_parameter_set_id | ue(v) |
|   for(i = 0; i < 2; i++) | |
|     num_ref_idx_default_active_minus1[ i ] | ue(v) |
|   rpl1_idx_present_flag | u(1) |
|   rbsp_trailing_bits( ) | |
| } | |

Slice Header Syntax

| | Descriptor |
|---|---|
| slice_header( ) { | |
|   slice_pic_parameter_set_id | ue(v) |
|   slice_address | u(v) |
|   slice_type | ue(v) |
|   if ( slice_type != I ) | |
|     log2_diff_ctu_max_bt_size | ue(v) |
|   if( nal_unit_type != IRAP_NUT ) { | |
|     slice_pic_order_cnt_lsb | u(v) |
|     for( i= 0; i < 2; i++ ) { | |
|       if( i == 0 \|\| (i == 1 && rpl1_idx_present_flag ) ) | |
|         ref_pic_list_sps_flag[ i ] | u(1) |
|       if( ref_pic_list_sps_flag[ i ] ) { | |
|         if( num_ref_pic_lists_in_sps[ i ] > 1) | |
|           if(i == 0 \|\| (i == 1 && rpl1_idx_present_flag ) ) | |
|             ref_pic_list_idx[ i ] | u(v) |
|       } else | |
|         ref_pic_list_struct( i, num_ref_pic_lists_in_sps[ i ], long_term_ref_pics_flag ) | |
|     } | |
|     if( slice_type = = P \|\| slice_type = = B ) { | |
|       num_ref_idx_active_override_flag | u(1) |
|       if( num_ref_idx_active_override_flag ) | |
|         for( i = 0; i < ( slice_type == B ? 2: 1 ); i++ ) | |
|           num_ref_idx_active_minus1[ i ] | ue(v) |
|     } | |
|   } | |
|   byte_alignment( ) | |
| } | |

Reference Picture List Structure Syntax

| | Descriptor |
|---|---|
| ref_pic_list_struct( listIdx, rplsIdx, ltrpFlag ) { | |
|   rpl_mode[ listIdx ][ rplsIdx ] | u(2) |
|   if( rpl_mode[ listIdx ][ rplsIdx ] = = 0 ) { | |
|     num_strp_entries[ listIdx ][ rplsIdx ] | ue(v) |
|     if( ltrpFlag ) | |
|       num_ltrp_entries[ listIdx ][ rplsIdx ] | ue(v) |
|     if( all_rpl_entries_same_sign_flag ) | |
|       strp_entries_sign_flag[listIdx][rplsIdx] | u(1) |
|     for( i = 0; i < NumEntriesInList[ listIdx ][ rplsIdx ]; i++) { | |
|       if( num_ltrp_entries[ listIdx ][ rplsIdx ] > 0 ) | |
|         lt_ref_pic_flag[ listIdx ][ rplsIdx ][ i ] | u(1) |
|       if( !lt_ref_pic_flag[ listIdx ][ rplsIdx ][ i ] ) { | |
|         if( !all_rpl_entries_same_sign_flag) | |

```
            strp_entry_sign_flag[listIdx] [rplsIdx][ i ]                u(1)
            delta_poc_st[ listIdx ][ rplsIdx ][ i ]                     ue(v)
         } else
            poc_lsb_lt[ listIdx ][ rplsIdx ][ i ]                       u(v)
      }
   } else if( rpl_mode[ listIdx ][ rplsIdx ] = = 1 ) {
      mode1_ref_rpl_idx_delta_minus1[ listIdx ][ rplsIdx ]              ue(v)
      strp_offset_val_minus1[ listIdx ][ rplsIdx ]                      ue(v)
      for( i = 0; i < NumEntriesInList[ 0 ][ RefRplIdx ]; i++)
         ref_entry_used_flag[ listIdx ][ rplsIdx ][ i ]                 u(1)
   } else if( rpl_mode[ listIdx ][ rplsIdx ] = = 2 ) {
      mode2_ref_rpl_idx[ listIdx ][ rplsIdx ]                           u(v)
      num_additional_entries[ listIdx ][ rplsIdx ]                      ue(v)
      for( i = 0; i < num_additional_entries[ listIdx ][ rplsIdx ]; i++) {
         if( ltrpFlag )
            add_lt_ref_pic_flag[ listIdx ][ rplsIdx ][ i ]              u(1)
         if( !add_lt_ref_pic_flag[ listIdx ][ rplsIdx ][ i ] ) {
            if( !all_rpl_entries_same_sign_flag )
               add_strp_entry_sign_flag[listIdx][rplsIdx][ i ]          u(1)
            add_delta_poc_st[ listIdx ][ rplsIdx ][ i ]                 ue(v)
         } else
            add_poc_lsb_lt[ listIdx ][ rplsIdx ][ i ]                   u(v)
      }
   } else if( rpl_mode[ listIdx ][ rplsIdx ] = = 3 )
      mode3_ref_rpl_idx[ listIdx ][ rplsIdx ]                           u(v)
}
```

NAL Unit Header Semantics

A forbidden_zero_bit shall be equal to 0. nal_unit_type specifies the type of RBSP data structure contained in the NAL unit.

TABLE 4-1

NAL unit type codes and NAL unit type classes

| nal_unit_type | Name of nal_unit_type | Content of NAL unit and RBSP syntax structure | NAL unit type class |
|---|---|---|---|
| 0 | NON_IRAP_NUT | Coded slice segment of a non-IRAP picture slice_layer_rbsp( ) | VCL |
| 1 | IRAP_NUT | Coded slice of an IRAP picture slice_layer_rbsp( ) | VCL |
| 2-15 | RSV_VCL_NUT | Reserved VCL NAL Units | VCL |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | EOS_NUT | End of sequence end_of_seq_rbsp( ) | non-VCL |
| 19 | EOB_NUT | End of bitstream end_of_bitstream_rbsp( ) | non-VCL |
| 20, 21 | PREFIX_SEI_NUT SUFFIX_SEI_NUT | Supplemental enhancement information sei_rbsp( ) | non-VCL |
| 22-26 | RSV_NVCL | Reserved | non-VCL |
| 27-31 | UNSPEC | Unspecified | non-VCL |

The nuh_temporal_id_plus1 minus 1 specifies a temporal identifier for the NAL unit. The value of nuh_temporal_id_plus1 shall not be equal to 0. The variable TemporalId is specified as follows: TemporalId=nuh_temporal_id_plus1−1. When nal_unit_type is equal to IRAP_NUT, the coded slice belongs to an IRAP picture, TemporalId shall be equal to 0. The value of TemporalId shall be the same for all VCL NAL units of an access unit. The value of TemporalId of a coded picture or an access unit is the value of the TemporalId of the VCL NAL units of the coded picture or the access unit. The value of TemporalId for non-VCL NAL units is constrained as follows: If nal_unit_type is equal to SPS_NUT, TemporalId shall be equal to 0 and the TemporalId of the access unit containing the NAL unit shall be equal to 0. Otherwise if nal_unit_type is equal to EOS_NUT or EOB_NUT, TemporalId shall be equal to 0. Otherwise, TemporalId shall be greater than or equal to the TemporalId of the access unit containing the NAL unit. When the NAL unit is a non-VCL NAL unit, the value of TemporalId is equal to the minimum value of the TemporalId values of all access units to which the non-VCL NAL unit applies. When nal_unit_type is equal to PPS_NUT, TemporalId may be greater than or equal to the TemporalId of the containing access unit, as all picture parameter sets (PPSs) may be included in the beginning of a bitstream, wherein the first coded picture has TemporalId equal to 0. When nal_unit_type is equal to PREFIX_SEI_NUT or SUFFIX_SEI_NUT, TemporalId may be greater than or equal to the TemporalId of the containing access unit, as an SEI NAL unit may contain information that applies to a bitstream subset that includes access units for which the TemporalId values are greater than the TemporalId of the access unit containing the SEI NAL unit. nuh_reserved_zero_7bits shall be equal to '0000000'. Other values of nuh_reserved_zero_7bits may be specified in the future by ITU-T|ISO/IEC. Decoders shall ignore (i.e., remove from the bitstream and discard) NAL units with values of nuh_reserved_zero_7bits not equal to '0000000'.
Sequence Parameter Set RBSP Semantics A log 2_max_pic_order_cnt_lsb_minus4 specifies the value of the variable MaxPicOrderCntLsb that is used in the decoding process for picture order count as follows: MaxPicOrderCntLsb=2 (log 2_max_pic_order_cnt_lsb_minus4+4). The value of log 2_max_pic_order_cnt_lsb_minus4 shall be in the range of 0 to 12, inclusive. sps_max_dec_pic_buffering_minus1 plus 1 specifies the maximum required size of the decoded picture buffer for the coded video sequence (CVS) in units of picture storage buffers. The value of sps_max_dec_pic_buffering_minus1 shall be in the range of 0 to MaxDpbSize−1, inclusive, where MaxDpbSize is as specified somewhere else. long_term_ref_pics_flag equal to 0 specifies that no LTRP is used for inter-prediction of any coded picture in the CVS. long_term_ref_pics_flag equal to 1 specifies that LTRPs may be used for inter-prediction of one or more coded pictures in the CVS. additional_lt_poc_lsb specifies the value of the variable MaxLtPicOrderCntLsb that is used in the decoding process for reference picture lists as follows: MaxLtPicOrderCntLsb=2(log 2_max_pic_order_cnt_lsb_minus4+4+additional_lt_poc_lsb). The value additional_lt_poc_lsb be in the range of 0 to of shall 32−log 2_max_pic_order_cnt_lsb_minus4−4, inclusive. When not present, the value of additional_lt_poc_lsb is inferred to be equal to 0.

An all_rpl_entries_same_sign_flag equal to 1 specifies that all STRP entries in each ref_pic_list_struct(listIdx, rplsIdx, ltrpFlag) have the same sign value, where the sign indicates positive or negative values. all_rpl_entries_same_sign_flag equal to 0 specifies that STRP entries in each ref_pic_list_struct(listIdx, rplsIdx, ltrpFlag) may or may not have the same sign value. rpl1_copy_from_rpl0_flag equal to specifies that num_ref_pic_lists_in_sps[1] and ref_pic_list_struct(1, rplsIdx, ltrpFlag) are not present and the following applies: The value of num_ref_pic_lists_in_sps[1] is set equal to the value of num_ref_pic_lists_in_sps[0]. The syntax structure ref_pic_list_struct(1, rplsIdx, ltrpFlag) is inferred to be identical to the value of ref_pic_list_struct(0, rplsIdx, ltrpFlag). Consequently the syntax elements in ref_pic_list_struct(1, rplsIdx, ltrpFlag) are respectively inferred to be equal to the syntax elements in ref_pic_list_struct(0, rplsIdx, ltrpFlag).

A num_ref_pic_lists_in_sps[i] specifies the number of the ref_pic_list_struct(listIdx, rplsIdx, ltrpFlag) syntax structures with listIdx equal to i included in the SPS. The value of num_ref_pic_lists_in_sps[i] shall be in the range of 0 to 64, inclusive. For each value of listIdx (equal to 0 or 1), a decoder should allocate memory for a total number of num_ref_pic_lists_in_sps[i]+1 ref_pic_list_struct(listIdx, rplsIdx, ltrpFlag) syntax structures since there may be one ref_pic_list_struct(listIdx, rplsIdx, ltrpFlag) syntax structure directly signaled in the slice headers of a current picture.
Picture Parameter Set RBSP Semantics A num_ref_idx_default_active_minus1 [i] plus 1, when i is equal to 0, specifies the inferred value of the variable NumRefIdxActive[0] for P or B slices with num_ref_idx_active_override_flag equal to 0, and, when i is equal to 1, specifies the inferred value of NumRefIdxActive[1] for B slices with num_ref_idx_active_override_flag equal to 0. The value of num_ref_idx_default_active_minus1 [i] shall be in the range of 0 to 14, inclusive. rpl1_idx_present_flag equal to 0 specifies that ref_pic_list_sps_flag[1] and ref_pic_list_idx[1] are not present in slice headers. rpl1_idx_present_flag equal to 1 specifies ref_pic_list_sps_flag[1] and ref_pic_list_idx[1] may be present in slice headers.
Slice Header Semantics When present, the value of each of the slice header syntax elements slice_pic_parameter_set_id and slice_pic_order_cnt_lsb shall be the same in all slice headers of a coded picture . . . slice_type specifies the coding type of the slice according to Table 7-3.

TABLE 7-3

Name association to slice_type

| slice_type | Name of slice_type |
| --- | --- |
| 0 | B (B slice) |
| 1 | P (P slice) |
| 2 | I (I slice) |

When nal_unit_type is equal to IRAP_NUT, i.e., the picture is an IRAP picture, slice_type shall be equal to 2 . . . slice_pic_order_cnt_lsb specifies the picture order count modulo MaxPicOrderCntLsb for the current picture. The length of the slice_pic_order_cnt_lsb syntax element is log 2_max_pic_order_cnt_lsb_minus4+4 bits. The value of the slice_pic_order_cnt_lsb shall be in the range of 0 to MaxPicOrderCntLsb−1, inclusive. When slice_pic_order_cnt_lsb is not present, slice_pic_order_cnt_lsb is inferred to be equal to 0. ref_pic_list_sps_flag[i] equal to 1 specifies that reference picture list i of the current picture is derived based on one of the ref_pic_list_struct(listIdx, rplsIdx, ltrpFlag) syntax structures with listIdx equal to i in the active SPS. ref_pic_list_sps_flag[i] equal to 0 specifies that reference picture list i of the current picture is derived based on the ref_pic_list_struct(listIdx, rplsIdx, ltrpFlag) syntax structure with listIdx equal to i that is directly included in the slice headers of the current picture. When num_ref_pic_lists_in_sps[i] is equal to 0, the value of ref_pic_list_sps_flag[i] shall be equal to 0. When rpl1_idx_present_flag is equal to 0 and ref_pic_list_sps_flag[0] is present, the value of ref_pic_list_sps_flag[1] is inferred to be equal to the value of ref_pic_list_sps_flag[0]. ref_pic_list_idx[i] specifies the index, into the list of the ref_pic_list_struct(listIdx, rplsIdx, ltrpFlag) syntax structures with listIdx equal to i included in the active SPS, of the ref_pic_list_struct(listIdx, rplsIdx, ltrpFlag) syntax structure with listIdx equal to i that is used for derivation of reference picture list i of the current picture. The syntax element ref_pic_list_idx[i] is represented by Ceil(Log 2(num_ref_pic_lists_in_sps[i])) bits. When not present, the value of ref_pic_list_idx[i] is inferred to be equal to 0. The value of ref_pic_list_idx[i] shall be in the range of 0 to num_ref_pic_lists_in_sps[i]−1, inclusive. When rpl1_idx_present_flag is equal to 0 and ref_pic_list_sps_flag[0] is present, the value of ref_pic_list_idx[1] is inferred to be equal to the value of ref_pic_list_idx[0]. num_ref_idx_active_override_flag equal to 1 specifies that the syntax element num_ref_idx_active_minus1 [0] is present for P and B slices and that the syntax element num_ref_idx_active_minus1 [1] is present for B slices. num_ref_idx_active_override_flag equal to 0 specifies that the syntax elements num_ref_idx_active_minus1 [0] and num_ref_idx_active_minus1 [1] are not present. num_ref_idx_active_minus1 [i], when present, specifies the value of the variable NumRefIdxActive[i] as follows: NumRefIdxActive[i]=num_ref_idx_active_minus1 [i]+1. The value of num_ref_idx_active_minus1 [i] shall be in the range of 0 to 14, inclusive.

The value of NumRefIdxActive[i]−1 specifies the maximum reference index for reference picture list i that may be used to decode the slice. When the value of NumRefIdxActive[i] is equal to 0, no reference index for reference picture list i may be used to decode the slice. For i equal to 0 or 1, when the current slice is a B slice and num_ref_idx_active_override_flag is equal to 0, NumRefIdxActive[i] is inferred to be equal to num_ref_idx_default_active_minus1 [i]+1. When the current slice is a P slice and num_ref_idx_active_override_flag is equal to 0, NumRefIdxActive[0] is inferred to be equal to num_ref_idx_default_active_minus1 [0]+1. When the current slice is a P slice, NumRefIdxActive[1] is inferred to be equal to 0. When the current slice is an I slice, both NumRefIdxActive[0] and NumRefIdxActive[1] are inferred to be equal to 0.

Alternatively, for i equal to 0 or 1, the following applies after the above: Let rplsIdx1 be set equal to ref_pic_list_sps_flag[i]? ref_pic_list_idx[i]: num_ref_pic_lists_in_sps[i], and numRpEntries[i] be equal to num_strp_entries[i][rplsIdx1]+num_ltrp_entries[i][rplsIdx1]. When NumRefIdxActive[i] is greater than numRpEntries[i], the value of NumRefIdxActive[i] is set equal to numRpEntries[i].

Reference Picture List Structure Semantics

The ref_pic_list_struct(listIdx, rplsIdx, ltrpFlag) syntax structure may be present in an SPS or in a slice header. Depending on whether the syntax structure is included in a slice header or an SPS, the following applies: If present in a slice header, the ref_pic_list_struct(listIdx, rplsIdx, ltrpFlag) syntax structure specifies reference picture list listIdx of the current picture (the picture containing the slice). Otherwise (present in an SPS), the ref_pic_list_struct(listIdx, rplsIdx, ltrpFlag) syntax structure specifies a candidate for reference picture list listIdx, and the term "the current picture" in the semantics specified in the remainder of this section refers to each picture that 1) has one or more slices containing ref_pic_list_idx[listIdx] equal to an index into the list of the ref_pic_list_struct(listIdx, rplsIdx, ltrpFlag) syntax structures included in the SPS, and 2) is in a CVS that has the SPS as the active SPS. rpl_mode[listIdx][rplsIdx] specifies the coding mode of syntax elements in the ref_pic_list_struct(listIdx, rplsIdx, ltrpFlag) syntax structure. num_strp_entries[listIdx][rplsIdx] specifies the number of STRP entries in the ref_pic_list_struct(listIdx, rplsIdx, syntax structure. ltrpFlag) num_ltrp_entries[listIdx][rplsIdx] specifies the number of LTRP entries in the ref_pic_list_struct(listIdx, rplsIdx, ltrpFlag) syntax structure. When not present, the value of num_ltrp_entries[listIdx][rplsIdx] is inferred to be equal to 0. The variable NumEntriesInList[listIdx][rplsIdx] is derived as follows: NumEntriesInList[listIdx][rplsIdx]=num_strp_entries[listIdx][rplsIdx]+num_ltrp_entries[listIdx][rplsIdx]. The value of NumEntriesInList[listIdx][rplsIdx] shall be in the range of 0 to sps_max_dec_pic_buffering_minus1, inclusive. strp_entries_sign_flag[listIdx][rplsIdx] equal to 1 specifies that all STRP entries in ref_pic_list_struct(listIdx, rplsIdx, ltrpFlag) have a value greater than or equal to 0. strp_entries_sign_flag[listIdx][rplsIdx] equal to 0 specifies that all STRP entries in ref_pic_list_struct(listIdx, rplsIdx, ltrpFlag) have value less than 0.

The lt_ref_pic_flag[listIdx][rplsIdx][i] equal to 1 specifies that the i-th entry in the ref_pic_list_struct(listIdx, rplsIdx, ltrpFlag) syntax structure is an LTRP entry. lt_ref_pic_flag[listIdx][rplsIdx][i] equal to 0 specifies that the i-th entry in the ref_pic_list_struct(listIdx, rplsIdx, ltrpFlag) syntax structure is an STRP entry. When not present, the value of lt_ref_pic_flag[listIdx][rplsIdx][i] is inferred to be equal to 0. It is a requirement of bitstream conformance that the sum of lt_ref_pic_flag[listIdx][rplsIdx][i] for all values of i in the range of 0 to NumEntriesInList[listIdx][rplsIdx]−1, inclusive, shall be equal to num_ltrp_entries[listIdx][rplsIdx]. strp_entry_sign_flag[listIdx][rplsIdx][i] equal to 1 specifies that i-th entry in ref_pic_list_struct(listIdx, rplsIdx, ltrpFlag) has a value greater than or equal to 0. strp_entries_sign_flag[listIdx][rplsIdx] equal to 0 specifies that the i-th entry in ref_pic_list_struct(listIdx, rplsIdx, ltrpFlag) has a value less than 0. When not present, the value of strp_entries_sign_flag[listIdx][rplsIdx][i] is inferred to be equal to the value of strp_entries_sign_flag[listIdx][rplsIdx].

The delta_poc_st[listIdx][rplsIdx][i], when the i-th entry is the first STRP entry in ref_pic_list_struct(rplsIdx, ltrpFlag) syntax structure, specifies the difference between the picture order count values of the current picture and the picture referred to by the i-th entry, or, when the i-th entry is an STRP entry but not the first STRP entry in the ref_pic_list_struct(rplsIdx, ltrpFlag) syntax structure, specifies the difference between the picture order count values of the pictures referred to by the i-th entry and by the previous STRP entry in the ref_pic_list_struct(listIdx, rplsIdx, ltrpFlag) syntax structure. The value of delta_poc_st[listIdx][rplsIdx][i] shall be in the range of −215 to 215−1, inclusive. poc_lsb_lt[listIdx][rplsIdx][i] specifies the value of the picture order count modulo MaxLtPicOrderCntLsb of the picture referred to by the i-th entry in the ref_pic_list_struct(listIdx, rplsIdx, ltrpFlag) syntax structure. The length of the poc_lsb_lt[listIdx][rplsIdx][i] syntax element is Log 2(MaxLtPicOrderCntLsb) bits. The array DeltaPocSt[listIdx][rplsIdx] is derived as follows:

```
for(i=0; i<NumEntriesInList[listIdx][rplsIdx];
  i++){
  if(!lt_ref_pic_flag[i][RplsIdx[i]][j]){
    DeltaPocSt[listIdx][rplsIdx][i]=(strp_entry_
      sign_flag[listIdx][rplsIdx][i])?
      delta_poc_st[listIdx][rplsIdx][i]: 0−delta_poc_st
        [listIdx][rplsIdx][i]
  }
}
```

The mode1_ref_rpl_idx_delta_minus1 [listIdx][rplsIdx] plus 1 specifies the difference between the value of rplsIdx and the index of the reference ref_pic_list_struct(listIdx, rplsIdx, ltrpFlag). When rpl_mode[listIdx][rplsIdx] is equal to 1, the variable RefRplIdx is derived as follows:

RefRplIdx=rplsIdx−
  (mode1_ref_rpl_idx_delta_minus1[listIdx][rplsIdx]+1)

The strp_offset_val_minus1 [listIdx][rplsIdx] plus 1 specifies the value to be substracted from each STRP entry in the reference ref_pic_list_struct(listIdx, rplsIdx, ltrpFlag) to compute the value of delta_poc_st[listIdx][rplsIdx][i] of the current ref_pic_list_struct(listIdx, rplsIdx, ltrpFlag). The ref_entry_used_flag[listIdx][rplsIdx][i] equal to 1 specifies that the i-th entry in ref_pic_list_struct(0, RefRplIdx, ltrpFlag) is used as an entry in the ref_pic_list_struct(listIdx, rplsIdx, ltrpFlag). ref_entry_used_flag[listIdx][rplsIdx] equal to 0 specifies that the i-th entry in the ref_pic_list_struct(0, RefRplIdx, ltrpFlag) is not used as an entry in the ref_pic_list_struct(listIdx, rplsIdx, ltrpFlag).

When rpl_mode[listIdx][rplsIdx] is equal to 1, the following applies for inference of the values of the syntax elements lt_ref_pic_flag[listIdx][rplsIdx][i], and when lt_ref_pic_flag[listIdx][rplsIdx][i] is equal to 1, poc_lsb_lt[listIdx][rplsIdx][i], and for derivation of the variable Delta- PocSt[listIdx][rplsIdx][i] (when lt_ref_pic_flag[listIdx][rplsIdx][i] is equal to 0) and the variable NumEntriesInList[listIdx][rplsIdx]:

currEntryIdx=0
    for(i=0; i<NumEntriesInList[0][RefRplsIdx]; i++){
      if(ref_entry_used_flag[listIdx][rplsIdx][i]){
        lt_ref_pic_flag[listIdx][rplsIdx][currEntryIdx])=
          lt_ref_pic_flag[0][RefRplsIdx][i])
        if(!lt_ref_pic_flag[0][RefRplsIdx][i])
          DeltaPocSt[listIdx][rplsIdx][currEntryIdx]=DeltaPocSt[0][RefRplsIdx][i]
        else
          poc_lsb_lt[listIdx][rplsIdx][currEntryIdx]=poc_lsb_lt[0][RefRplsIdx][i]
        currEntryIdx++
      }
    }
    NumEntriesInList[listIdx][rplsIdx]=currEntryIdx The mode2_ref_rpl_idx[listIdx][rplsIdx] specifies the index of the reference ref_pic_list_struct(listIdx, rplsIdx, ltrpFlag). The syntax element mode2_ref_rpl_idx[listIdx][rplsIdx] is represented by Ceil(Log 2(num_ref_pic_lists_in_sps[0])) bits. When rpl_mode[listIdx][rplsIdx] is equal to 2, the variable RefRplIdx is derived as follows:

RefRplIdx=mode2_ref_rpl_idx[listIdx][rplsIdx]

The num_additional_entries[listIdx][rplsIdx] specifies the delta between NumEntriesInList[listIdx][rplsIdx] and NumEntriesInList[0][RefRplIdx]. The add_lt_ref_pic_flag[listIdx][rplsIdx][i] is used for inference of the value of lt_ref_pic_flag[listIdx][rplsIdx][NumEntriesInList[0][RefRplIdx]+i]. When not present, the value of add_lt_ref_pic_flag[listIdx][rplsIdx][i] is inferred to be equal to 0. The add_strp_entry_sign_flag[listIdx][rplsIdx][i] is used for inference of the value of strp_entry_sign_flag[listIdx][rplsIdx][NumEntriesInList[0][RefRplIdx]+i]. When not present, the value of add_strp_entries_sign_flag[listIdx][rplsIdx][i] is set to be equal to the value of strp_entries_sign_flag[listIdx][rplsIdx].

The add_delta_poc_st[listIdx][rplsIdx][i] is used for inferrence of the value of delta_poc_st[listIdx][rplsIdx][NumEntriesInList[0][RefRplIdx]+i]. The value of add_delta_poc_st[listIdx][rplsIdx][i] shall be in the range of −215 to 215−1, inclusive. The add_poc_lsb_lt[listIdx][rplsIdx][i] is used for inferrence of the value of poc_lsb_lt[listIdx][rplsIdx][NumEntriesInList[0][RefRplIdx]+i]. The length of the add_poc_lsb_lt[listIdx][rplsIdx][i] syntax element is Log 2(MaxLtPicOrderCntLsb) bits.

When rpl_mode[listIdx][rplsIdx] is equal to 2, the following applies for inference of the values of the syntax elements strp_entries_sign_flag[listIdx][rplsIdx], lt_ref_pic_flag[listIdx][rplsIdx][i], and when lt_ref_pic_flag[listIdx][rplsIdx][i] is equal to 1, poc_lsb_lt[listIdx][rplsIdx][i], and for derivation of the variable DeltaPocSt[listIdx][rplsIdx][i] (when lt_ref_pic_flag[listIdx][rplsIdx][i] is equal to 0) and the variable NumEntriesInList[listIdx][rplsIdx]:

strp_entries_sign_flag[listIdx][rplsIdx]=strp_entries_sign_flag[0][RefRplsIdx]
    for(i=0; i<NumEntriesInList[0][RefRplsIdx]; i++){
      lt_ref_pic_flag[listIdx][rplsIdx][i])=lt_ref_pic_flag[0][RefRplsIdx][i])
      if(!lt_ref_pic_flag[0][RefRplsIdx][i])
        DeltaPocSt[listIdx][rplsIdx][i]=DeltaPocSt[0][RefRplsIdx][i]
      else
        poc_lsb_lt[listIdx][rplsIdx][i]=poc_lsb_lt[0][RefRplsIdx][i]
    }
    currEntryIdx=NumEntriesInList[0][RefRplsIdx]
    for(i=0; i<num_additional_entries[listIdx][rplsIdx]; i++, currEntryIdx++){
      lt_ref_pic_flag[listIdx][rplsIdx][currEntryIdx])=add_lt_ref_pic_flag[listIdx][rplsIdx][i])
      if(!add_lt_ref_pic_flag[listIdx][rplsIdx][i])
        DeltaPocSt[listIdx][rplsIdx][currEntryIdx]=
          (add_strp_entry_sign_flag[listIdx][rplsIdx][i])?
          add_delta_poc_st[listIdx][rplsIdx][i]: 0−add_delta_poc_st[listIdx][rplsIdx][i]
      else
        poc_lsb_lt[listIdx][rplsIdx][currEntryIdx]=add_poc_lsb_lt[listIdx][rplsIdx][i]
    }
    NumEntriesInList[listIdx][rplsIdx]=currEntryIdx The mode3_ref_rpl_idx[listIdx][rplsIdx] specifies the index of the reference ref_pic_list_struct(listIdx, rplsIdx, ltrpFlag). The syntax element mode3_ref_rpl_idx[listIdx][rplsIdx] is represented by Ceil(Log 2(num_ref_pic_lists_in_sps[0])) bits. When rpl_mode[listIdx][rplsIdx] is equal to 3, the variable RefRplIdx is derived as follows:

RefRplIdx=mode3_ref_rpl_idx[listIdx][rplsIdx]

When rpl_mode[listIdx][rplsIdx] is equal to 3, the following applies for inferrence of the values of the syntax elements lt_ref_pic_flag[listIdx][rplsIdx][i], and when lt_ref_pic_flag[listIdx][rplsIdx][i] is equal to 1, poc_lsb_lt[listIdx][rplsIdx][i], and for derivation of the variable DeltaPocSt[listIdx][rplsIdx][i] (when lt_ref_pic_flag[listIdx][rplsIdx][i] is equal to 0) and the variable NumEntriesInList[listIdx][rplsIdx]:

for(i=0; i<NumEntriesInList[0][RefRplsIdx]; i++) {
      lt_ref_pic_flag[listIdx][rplsIdx][i])=lt_ref_pic_flag[0][RefRplsIdx][i])
      if(!lt_ref_pic_flag[0][RefRplsIdx][i])
        DeltaPocSt[listIdx][rplsIdx][i]=0-DeltaPocSt[0][RefRplsIdx][i]
      else
        poc_lsb_lt[listIdx][rplsIdx][i]=poc_lsb_lt[0][RefRplsIdx][i]}
    }
    NumEntriesInList[listIdx][rplsIdx]=NumEntriesInList[0][RefRplsIdx]

A general decoding process is provided.

The decoding process operates as follows for the current picture CurrPic: The decoding of NAL units is specified below. The processes below specify the following decoding processes using syntax elements in the slice header layer and above: Variables and functions relating to picture order count are derived. This is invoked only for the first slice of a picture. At the beginning of the decoding process for each slice of a non-IRAP picture, the decoding process for reference picture lists construction is invoked for derivation of reference picture list 0 (RefPicList[0]) and reference picture list 1 (RefPicList[1]). The decoding process for reference picture marking is invoked, wherein reference pictures may be marked as "unused for reference" or "used for long-term reference." This is invoked only for the first slice of a picture. The decoding processes for coding tree units, scaling, transform, in-loop filtering, etc., are invoked. After all slices of the current picture have been decoded, the current decoded picture is marked as "used for short-term reference."

A NAL unit decoding process is provided.

Inputs to this process are NAL units of the current picture and their associated non-VCL NAL units. Outputs of this process are the parsed RBSP syntax structures encapsulated within the NAL units. The decoding process for each NAL unit extracts the RBSP syntax structure from the NAL unit and then parses the RBSP syntax structure.

A slice decoding process is provided.

The decoding process for picture order count is as follows.

Output of this process is PicOrderCntVal, the picture order count of the current picture. Picture order counts are used to identify pictures, for deriving motion parameters in merge mode and motion vector prediction, and for decoder conformance checking. Each coded picture is associated with a picture order count variable, denoted as PicOrderCntVal. When the current picture is not an IRAP picture, the variables prevPicOrderCntLsb and prevPicOrderCntMsb are derived as follows: Let prevTid0Pic be the previous picture in decoding order that has TemporalId equal to 0. The variable prevPicOrderCntLsb is set equal to slice_pic_order_cnt_lsb of prevTid0Pic. The variable prevPicOrderCntMsb is set equal to PicOrderCntMsb of prevTid0Pic.

The variable PicOrderCntMsb of the current picture is derived as follows: If the current picture is an IRAP picture, PicOrderCntMsb is set equal to 0. Otherwise, PicOrderCntMsb is derived as follows:

if((slice_pic_order_cnt_lsb<prevPicOrderCntLsb)&&
((prevPicOrderCntLsb−slice_pic_order_cnt_l
sb)>=(MaxPicOrderCntLsb/2)))

PicOrderCntMsb=prevPicOrderCntMsb+MaxPicOrderCntLsb else
if((slice_pic_order_cnt_lsb>prevPicOrderCntLsb)
&&((slice_pic_order_cnt_lsb−prevPicOrderCntLsb)>(MaxPicOrderCntLsb/2)))

PicOrderCntMsb=prevPicOrderCntMsb−MaxPicOrderCntLsb else

PicOrderCntMsb=prevPicOrderCntMsb

PicOrderCntVal is derived as follows: PicOrderCntVal=PicOrderCntMsb+slice_pic_order_cnt_lsb.

All IRAP pictures will have PicOrderCntVal equal to 0 since slice_pic_order_cnt_lsb is inferred to be 0 for IRAP pictures and prevPicOrderCntLsb and prevPicOrderCntMsb are both set equal to 0. The value of PicOrderCntVal shall be in the range of −231 to 231−1, inclusive. In one CVS, the PicOrderCntVal values for any two coded pictures shall not be the same.

At any moment during the decoding process, the values of PicOrderCntVal & (MaxLtPicOrderCntLsb−1) for any two reference pictures in the DPB shall not be the same. The function PicOrderCnt (picX) is specified as follows: PicOrderCnt (picX)=PicOrderCntVal of the picture picX. The function DiffPicOrderCnt (picA, picB) is specified as follows: DiffPicOrderCnt (picA, picB)=PicOrderCnt (picA)−PicOrderCnt (picB). The bitstream shall not contain data that result in values of DiffPicOrderCnt (picA, picB) used in the decoding process that are not in the range of −215 to 215−1, inclusive. Let X be the current picture and Y and Z be two other pictures in the same CVS, Y and Z are considered to be in the same output order direction from X when both DiffPicOrderCnt (X, Y) and DiffPicOrderCnt (X, Z) are positive or both are negative.

A decoding process for reference picture lists construction is provided.

This process is invoked at the beginning of the decoding process for each slice of a non-IRAP picture. Reference pictures are addressed through reference indices. A reference index is an index into a reference picture list. When decoding an I slice, no reference picture list is used in decoding of the slice data. When decoding a P slice, only reference picture list 0 (i.e., RefPicList[0]), is used in decoding of the slice data. When decoding a B slice, both reference picture list 0 and reference picture list 1 (i.e., RefPicList[1]) are used in decoding of the slice data. At the beginning of the decoding process for each slice of a non-IRAP picture, the reference picture lists RefPicList[0] and RefPicList[1] are derived. The reference picture lists are used in marking of reference pictures or in decoding of the slice data. For an I slice of a non-IRAP picture that is not the first slice of the picture, RefPicList[0] and RefPicList[1] may be derived for bitstream conformance checking purpose, but their derivation is not necessary for decoding of the current picture or pictures following the current picture in decoding order. For a P slice that is not the first slice of a picture, RefPicList[1] may be derived for bitstream conformance checking purpose, but its derivation is not necessary for decoding of the current picture or pictures following the current picture in decoding order. The reference picture lists RefPicList[0] and RefPicList[1] are constructed as follows:

for(i=0; i<2; i++){
  if(ref_pic_list_sps_flag[i])
    RplsIdx[i]=ref_pic_list_idx[i]
  else
    RplsIdx[i]=num_ref_pic_lists_in_sps[i]
  for(j=0, pocBase=PicOrderCntVal;
      j<NumEntriesInList[i][RplsIdx[i]]; j++){
    if(!lt_ref_pic_flag[i][RplsIdx[i]][j]){
      RefPicPocList[i][j]=pocBase−DeltaPocSt[i][RplsIdx[i]][j]
      if(there is a reference picture picA in the DPB with
          PicOrderCntVal equal to RefPicPocList[i][j])
        RefPicList[i][j]=picA
      else
        RefPicList[i][j]="no reference picture"
      pocBase=RefPicPocList[i][j]
    } else{
      if(there is a reference picA in the DPB with
          PicOrderCntVal & (MaxLtPicOrderCntLsb−1)
          equal to poc_lsb_lt[i][RplsIdx[i]][j])
        RefPicList[i][j]=picA
      else
        RefPicList[i][j]="no reference picture"
    }
  }
}

For each i equal to 0 or 1, the following applies: The first NumRefIdxActive[i] entries in RefPicList[i] are referred to as the active entries in RefPicList[i], and the other entries in RefPicList[i] are referred to as the inactive entries in RefPicList[i]. Each entry in RefPicList[i][j] for j in the range of 0 to NumEntriesInList[i][RplsIdx[i]]−1, inclusive, is referred to as an STRP entry if lt_ref_pic_flag[i][RplsIdx[i]][j] is equal to 0, and as an LTRP entry otherwise. It is possible that a particular picture is referred to by both an entry in RefPicList[0] and an entry in RefPicList[1]. It is also possible that a particular picture is referred to by more than one entry in RefPicList[0] or by more than one entry in RefPicList[1]. The active entries in RefPicList[0] and the active entries in RefPicList[1] collectively refer to all reference pictures that may be used for inter-prediction of the current picture and one or more pictures that follow the current picture in decoding order. The inactive entries in RefPicList[0] and the inactive entries in RefPicList[1] collectively refer to all reference pictures that are not used for inter-prediction of the current picture but may be used in inter-prediction for one or more pictures that follow the current picture in decoding order. There may be one or more entries in RefPicList[0] or RefPicList[1] that are equal to "no reference picture" because the corresponding pictures are not present in the DPB. Each inactive entry in RefPicList[0] or RefPicList[0] that is equal to "no reference picture" should be ignored. An unintentional picture loss should be inferred for each active entry in RefPicList[0] or RefPicList[1] that is equal to "no reference picture."

It is a requirement of bitstream conformance that the following constraints apply: For each i equal to 0 or 1, NumEntriesInList[i][RplsIdx[i]] shall not be less than NumRefIdxActive[i]. The picture referred to by each active entry in RefPicList[0] or RefPicList[1] shall be present in the DPB and shall have TemporalId less than or equal to that of the current picture. Optionally, the following constraint may be further specified: The entry index of any inactive entry in RefPicList[0] or RefPicList[1] shall not be used as a reference index for decoding of the current picture. Optionally, the following constraint may be further specified: An inactive entry in RefPicList[0] or RefPicList[1] shall not refer to the same picture as any other entry in RefPicList[0] or RefPicList[1]. An STRP entry in RefPicList[0] or RefPicList[1] of a slice of a picture and an LTRP entry in RefPicList[0] or RefPicList[1] of the same slice or a different slice of the same picture shall not refer to the same picture. The current picture itself shall not be referred to by any entry in RefPicList[0] or RefPicList[1]. There shall be no LTRP entry in RefPicList[0] or RefPicList[1] for which the difference between the PicOrderCntVal of the current picture and the PicOrderCntVal of the picture referred to by the entry is greater than or equal to 224. Let setOfRefPics be the set of unique pictures referred to by all entries in RefPicList[0] and all entries in RefPicList[1]. The number of pictures in setOfRefPics shall be less than or equal to sps_max_dec_pic_buffering_minus1 and setOfRefPics shall be the same for all slices of a picture.

A decoding process for reference picture marking is provided.

This process is invoked once per picture, after decoding of a slice header and the decoding process for reference picture list construction for the slice, but prior to the decoding of the slice data. This process may result in one or more reference pictures in the DPB being marked as "unused for reference" or "used for long-term reference." A decoded picture in the DPB can be marked as "unused for reference," "used for short-term reference" or "used for long-term reference," but only one among these three at any given moment during the operation of the decoding process. Assigning one of these markings to a picture implicitly removes another of these markings when applicable. When a picture is referred to as being marked as "used for reference," this collectively refers to the picture being marked as "used for short-term reference" or "used for long-term reference" (but not both). When the current picture is an IRAP picture, all reference pictures currently in the DPB (if any) are marked as "unused for reference." STRPs are identified by their PicOrderCnt Val values. LTRPs are i identified by the Log 2(MaxLtPicOrderCntLsb) LSBs of their PicOrderCntVal values. The following applies: For each LTRP entry in RefPicList[0] or RefPicList[1], when the referred picture is an STRP, the picture is marked as "used for long-term reference". Each reference picture in the DPB that is not referred to by any entry in RefPicList[0] or RefPicList[1] is marked as "unused for reference."

Figure 8:
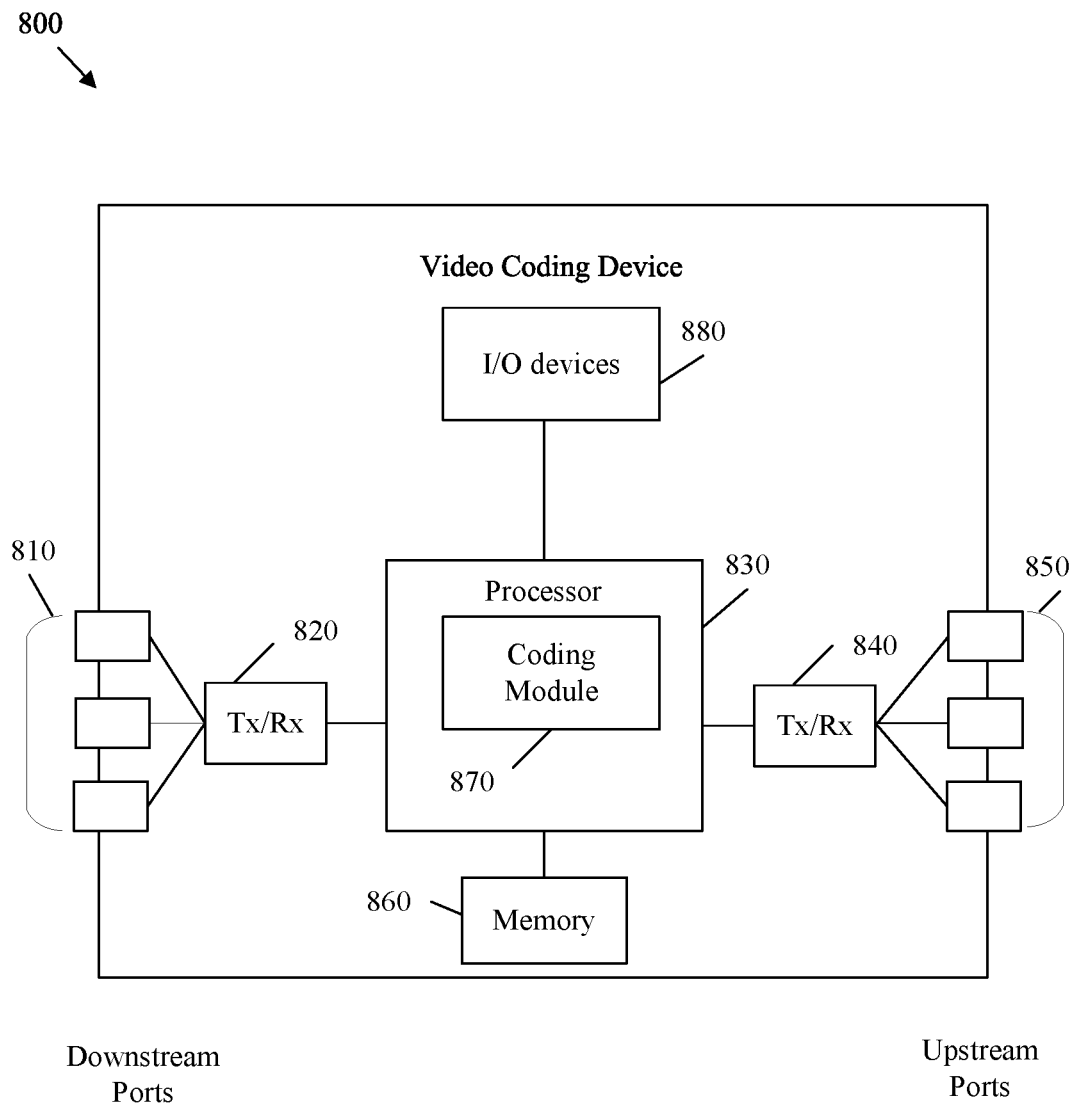
FIG. 8 is a schematic diagram of a video coding device.

FIG. 8 is a schematic diagram of a video coding device 800 (e.g., a video encoder 20 or a video decoder 30) according to an embodiment of the disclosure. The video coding device 800 is suitable for implementing the disclosed embodiments as described herein. The video coding device 800 comprises ingress ports 810 and receiver units (Rx) 820 for receiving data; a processor, logic unit, or central processing unit (CPU) 830 to process the data; transmitter units (Tx) 840 and egress ports 850 for transmitting the data; and a memory 860 for storing the data. The video coding device 800 may also comprise optical-to-electrical (OE) components and electrical-to-optical (EO) components coupled to the ingress ports 810, the receiver units 820, the transmitter units 840, and the egress ports 850 for egress or ingress of optical or electrical signals.

The processor 830 is implemented by hardware and software. The processor 830 may be implemented as one or more CPU chips, cores (e.g., as a multi-core processor), field-programmable gate arrays (FPGAs), application specific integrated circuits (ASICs), and digital signal processors (DSPs). The processor 830 is in communication with the ingress ports 810, receiver units 820, transmitter units 840, egress ports 850, and memory 860. The processor 830 comprises a coding module 870. The coding module 870 implements the disclosed embodiments described above. For instance, the coding module 870 implements, processes, prepares, or provides the various networking functions. The inclusion of the coding module 870 therefore provides a substantial improvement to the functionality of the video coding device 800 and effects a transformation of the video coding device 800 to a different state. Alternatively, the coding module 870 is implemented as instructions stored in the memory 860 and executed by the processor 830.

The video coding device 800 may also include input and/or output (I/O) devices 880 for communicating data to and from a user. The I/O devices 880 may include output devices such as a display for displaying video data, speakers for outputting audio data, etc. The I/O devices 880 may also include input devices, such as a keyboard, mouse, trackball, etc., and/or corresponding interfaces for interacting with such output devices.

The memory 860 comprises one or more disks, tape drives, and solid-state drives and may be used as an overflow data storage device, to store programs when such programs are selected for execution, and to store instructions and data that are read during program execution. The memory 860 may be volatile and/or non-volatile and may be read-only memory (ROM), random access memory (RAM), ternary content-addressable memory (TCAM), and/or static random-access memory (SRAM).

Figure 9:
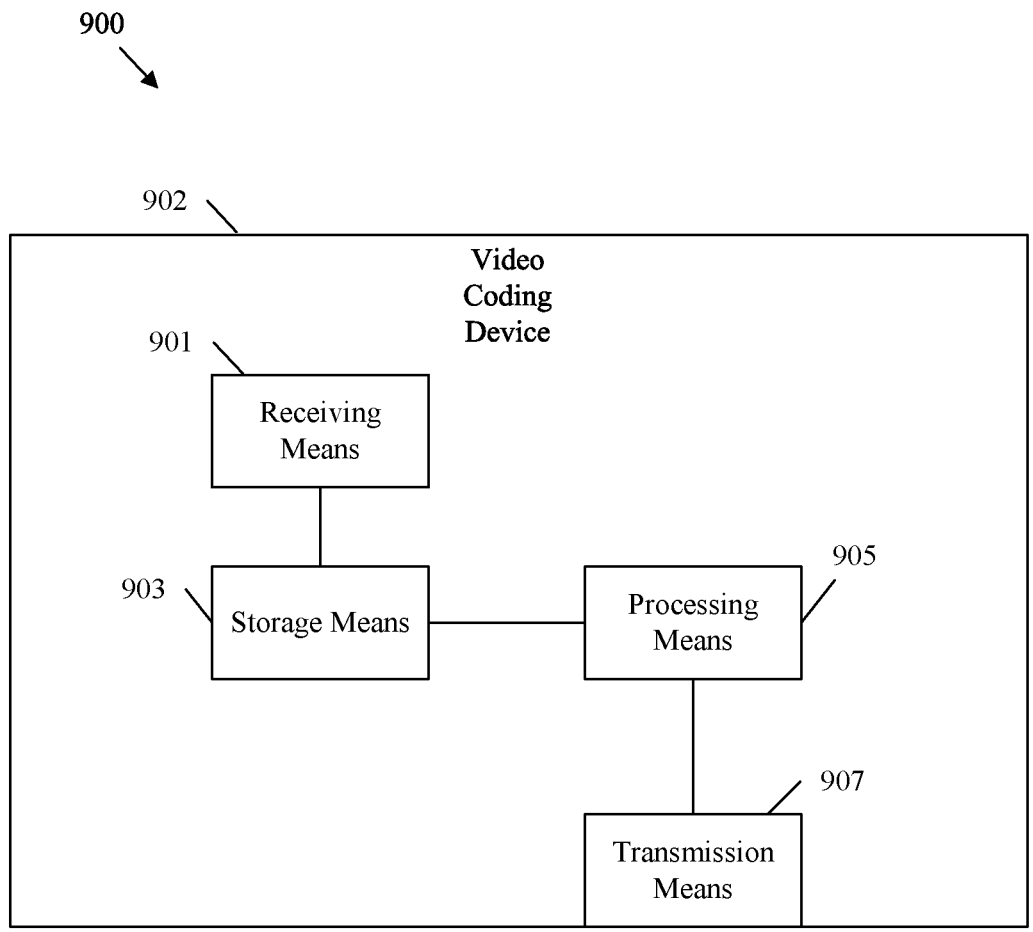
FIG. 9 is a schematic diagram of an embodiment of a means for coding.

FIG. 9 is a schematic diagram of an embodiment of a means for coding 900. In an embodiment, the means for coding 900 is implemented in a video coding device 902 (e.g., a video encoder 20 or a video decoder 30). The video coding device 902 includes receiving means 901. The receiving means 901 is configured to receive a picture to encode or to receive a bitstream to decode. The video coding device 902 includes transmission means 907 coupled to the receiving means 901. The transmission means 907 is configured to transmit the bitstream to a decoder or to transmit a decoded image to a display means (e.g., one of the I/O devices 880).

The video coding device 902 includes a storage means 903. The storage means 903 is coupled to at least one of the receiving means 901 or the transmission means 907. The storage means 903 is configured to store instructions. The video coding device 902 also includes processing means 905. The processing means 905 is coupled to the storage means 903. The processing means 905 is configured to execute the instructions stored in the storage means 903 to perform the methods disclosed herein.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of decoding a coded video bitstream implemented by a video decoder, comprising:
    parsing, from the coded video bitstream, a flag;
    parsing, from the coded video bitstream, a ref_pic_list_sps_flag[0] and a ref_pic_list_idx[0] to a first reference picture list syntax structure;
    determining that a ref_pic_list_sps_flag[1] and a ref_pic_list_idx[1] to a second reference picture list syntax structure are not present in a slice header of the coded video bitstream and values of the ref_pic_list_sps_flag[1] and the ref_pic_list_idx[1] to the second reference picture list syntax structure are the same as values of ref_pic_list_sps_flag[0] and the ref_pic_list_idx[0] to the first reference picture list syntax structure, respectively, when the flag has a first value,
    wherein
        the ref_pic_list_sps_flag[i] equal to 1 specifies that a reference picture list i of a current picture is derived based on one of reference picture list syntax structures with a listIdx equal to i in an active sequence parameter set (SPS), and the ref_pic_list_sps_flag[i] equal to 0 specifies that the reference picture list i of the current picture is derived based on a reference picture list syntax structures with the listIdx equal to i that is directly included in the slice header,
        the ref_pic_list_idx[i] specifies an index, into a list of the reference picture list syntax structures with the listIdx equal to i included in the active SPS, of the reference picture list syntax structure with the listIdx equal to i that is used for derivation of the reference picture list i of the current picture,
        i is equal to 0 or 1,
    parsing, from the slice header, the ref_pic_list_sps_flag[1] and the ref_pic_list_idx[1] to the second reference picture list syntax structure are present in the slice header when the flag has a second value;
    generating a reference picture list using at least one of the first reference picture list syntax structure or the second reference picture list syntax structure from the coded video bitstream; and performing inter-prediction based on the reference picture list to generate a reconstructed block.

2. The method of claim 1, wherein the flag is designated rpl1_idx_present_flag.

3. The method of claim 1, wherein the flag is included in a picture parameter set (PPS) of the coded video bitstream.

4. The method of claim 1, wherein the flag is included in the SPS of the coded video bitstream.

5. The method of claim 1, wherein the first reference picture list syntax structure is included in the slice header of the coded video bitstream.

6. The method of claim 1, wherein the flag is included in a picture parameter set (PPS) of the coded video bitstream and the first reference picture list syntax structure is included in the slice header of the coded video bitstream.

7. The method of claim 1, wherein the first value of the flag is 0.

8. The method of claim 7, wherein the ref_pic_list_sps_flag[1] and the ref_pic_list_idx[1] are not included in the slice header when the first value of the flag is 0.

9. The method of claim 1, wherein the second value of the flag is 1.

10. The method of claim 9, the ref_pic_list_sps_flag[0] and the ref_pic_list_idx[0] are included in the slice header when the second value of the flag is 1.

11. A method of encoding a video bitstream implemented by a video encoder, comprising:
    determining whether a ref_pic_list_sps_flag[1] and a ref_pic_list_idx[1] to a second reference picture list syntax structure are present in a slice header in an encoded bitstream;
    encoding a flag with a first value into the video bitstream when determining that the ref_pic_list_sps_flag[1] and the ref_pic_list_idx[1] to the second reference picture list syntax structure are not present in the slice header of the video bitstream and values of the ref_pic_list_sps_flag[1] and the ref_pic_list_idx[1] to the second reference picture list syntax structure are the same as values of a ref_pic_list_sps_flag[0] and a ref_pic_list_idx[0] to a first reference picture list syntax structure, respectively;
    wherein
        the ref_pic_list_sps_flag[i] equal to 1 specifies that a reference picture list i of a current picture is derived based on one of reference picture list syntax structures with a listIdx equal to i in an active sequence parameter set (SPS), and the ref_pic_list_sps_flag[i] equal to 0 specifies that the reference picture list i of the current picture is derived based on a reference picture list syntax structures with the listIdx equal to i that is directly included in the slice header,
the ref_pic_list_idx[i] specifies an index, into a list of the reference picture list syntax structures with the listIdx equal to i included in the active SPS, of the reference picture list syntax structure with the listIdx equal to i that is used for derivation of the reference picture list i of the current picture,
i is equal to 0 or 1,
encoding the flag with a second value into the video bitstream when determining that the ref_pic_list_sps_flag[1] and the ref_pic_list_idx[1] to the second reference picture list syntax structure are present in the slice header of the video bitstream;
encoding the ref_pic_list_sps_flag[0] and the ref_pic_list_idx[0] to the first reference picture list syntax structure into the video bitstream when the flag is encoded with the first value; and
encoding the ref_pic_list_sps_flag[0] and the ref_pic_list_idx[0] to the first reference picture list syntax structure and the ref_pic_list_sps_flag[1] and the ref_pic_list_idx[1] to the second reference picture list syntax structure into the video bitstream when the flag is encoded with the second value.

12. The method of claim 11, wherein the flag is designated rpl1_idx_present_flag.

13. The method of claim 11, wherein the flag is encoded in a picture parameter set (PPS) of the video bitstream.

14. The method of claim 11, wherein the first reference picture list syntax structure is encoded in the slice header of the video bitstream.

15. The method of claim 11, wherein the first reference picture list syntax structure and the second reference picture list syntax structure are encoded in the slice header of the video bitstream.

16. The method of claim 11, wherein the first value of the flag is 0 and the second value of the flag is 1.

17. The method of claim 16, wherein the ref_pic_list_sps_flag[1] and the ref_pic_list_idx[1] are not included in the slice header when the first value of the flag is 0.

18. A decoding device, comprising:
a receiver configured to receive a coded video bitstream;
a memory coupled to the receiver, the memory storing instructions; and
one or more processors coupled to the memory, the one or more processors configured to execute the instructions stored in the memory to cause the decoding device to:
parse, from the coded video bitstream, a flag;
parse, from the coded video bitstream, a ref_pic_list_sps_flag[0] and a ref_pic_list_idx[0] to a first reference picture list syntax structure;
determine that a ref_pic_list_sps_flag[1] and a ref_pic_list_idx[1] to a second reference picture list syntax structure are not present in a slice header of the coded video bitstream and values of the ref_pic_list_sps_flag[1] and the ref_pic_list_idx[1] to the second reference picture list syntax structure are the same as values of ref_pic_list_sps_flag[0] and the ref_pic_list_idx[0] to the first reference picture list syntax structure, respectively, when the flag has a first value,
wherein
the ref_pic_list_sps_flag[i] equal to 1 specifies that a reference picture list i of a current picture is derived based on one of reference picture list syntax structures with a listIdx equal to i in an active sequence parameter set (SPS), and the ref_pic_list_sps_flag[i] equal to 0 specifies that the reference picture list i of the current picture is derived based on a reference picture list syntax structures with the listIdx equal to i that is directly included in the slice header,
the ref_pic_list_idx[i] specifies an index, into a list of the reference picture list syntax structures with the listIdx equal to i included in the active SPS, of the reference picture list syntax structure with the listIdx equal to i that is used for derivation of the reference picture list i of the current picture,
i is equal to 0 or 1,
parse, from the slice header, the ref_pic_list_sps_flag[1] and the ref_pic_list_idx[1] to the second reference picture list syntax structure are present in the slice header when the flag has a second value;
generate a reference picture list using at least one of the first reference picture list syntax structure or the second reference picture list syntax structure; and
perform inter-prediction based on the reference picture list to generate a reconstructed block.

19. The decoding device of claim 18, further comprising a display configured to display an image generated using the reconstructed block.

20. The decoding device of claim 18, wherein the flag is designated rpl1_idx_present_flag.

21. The decoding device of claim 18, wherein the flag is included in a picture parameter set (PPS) of the coded video bitstream.

22. The decoding device of claim 18, wherein the first reference picture list syntax structure is included in the slice header of the coded video bitstream.

23. The decoding device of claim 18, wherein the first value of the flag is 0 and the second value of the flag is 1.

24. The decoding device of claim 23, wherein the ref_pic_list_sps_flag[1] and the ref_pic_list_idx[1] are not included in the slice header when the first value of the flag is 0.

25. An encoding device, comprising:
one or more processors configured to:
determine whether a ref_pic_list_sps_flag[1] and a ref_pic_list_idx[1] to a second reference picture list syntax structure are present in a slice header in an encoded bitstream;
encode a flag with a first value into a video bitstream when determining that the ref_pic_list_sps_flag[1] and the ref_pic_list_idx[1] to the second reference picture list syntax structure are not present in the slice header of the video bitstream and values of the ref_pic_list_sps_flag[1] and the ref_pic_list_idx[1] to the second reference picture list syntax structure are the same as values of a ref_pic_list_sps_flag[0] and a ref_pic_list_idx[0] to a first reference picture list syntax structure, respectively;
wherein
the ref_pic_list_sps_flag[i] equal to 1 specifies that a reference picture list i of a current picture is derived based on one of reference picture list syntax structures with a listIdx equal to i in an active sequence parameter set (SPS), and the ref_pic_list_sps_flag[i] equal to 0 specifies that the reference picture list i of the current picture is derived based on a reference picture list syntax structures with the listIdx equal to i that is directly included in the slice header,
the ref_pic_list_idx[i] specifies an index, into a list of the reference picture list syntax structures with the listIdx equal to i included in the active SPS, of the reference picture list syntax structure with the listIdx equal to i that is used for derivation of the reference picture list i of the current picture, i is equal to 0 or 1, encode the flag with a second value into the video bitstream when determining that the ref_pic_list_sps_flag[1] and the ref_pic_list_idx[1] to the second reference picture list syntax structure are present in the slice header of the video bitstream;

encode the ref_pic_list_sps_flag[0] and the ref_pic_list_idx[0] to the first reference picture list syntax structure into the video bitstream when the flag is encoded with the first value; and encode the ref_pic_list_sps_flag[0] and the ref_pic_list_idx[0] to the first reference picture list syntax structure and the ref_pic_list_sps_flag[1] and the ref_pic_list_idx[1] to the second reference picture list syntax structure into the video bitstream when the flag is encoded with the second value.

26. The encoding device of claim 25, wherein the flag is designated rpl1_idx_present_flag.

27. The encoding device of claim 25, wherein the flag is encoded in a picture parameter set (PPS) of the video bitstream.

28. The encoding device of claim 25, wherein the first reference picture list syntax structure is encoded in the slice header of the video bitstream.

29. The encoding device of claim 25, wherein the first value of the flag is 0 and the second value of the flag is 1.

30. The encoding device of claim 29, wherein the ref_pic_list_sps_flag[1] and the ref_pic_list_idx[1] are not included in the slice header when the first value of the flag is 0.

* * * * *